United States Patent [19]
Irie et al.

[11] Patent Number: 5,926,655
[45] Date of Patent: Jul. 20, 1999

[54] LINE OF SIGHT DETECTION DEVICE AND AN APPARATUS HAVING A LINE OF SIGHT DETECTION DEVICE

[75] Inventors: Yoshiaki Irie, Yokohama; Keisuke Aoyama, Kawasaki, both of Japan

[73] Assignee: Canon Kabushiki Kaisha, Tokyo, Japan

[21] Appl. No.: 08/900,398

[22] Filed: Jul. 21, 1997

Related U.S. Application Data

[63] Continuation of application No. 08/694,175, Aug. 8, 1996, abandoned.

[30] Foreign Application Priority Data

| Aug. 15, 1995 | [JP] | Japan | 7-228607 |
| Aug. 15, 1995 | [JP] | Japan | 7-228608 |
| Aug. 18, 1995 | [JP] | Japan | 7-232115 |

[51] Int. Cl.$^6$ ............................................ G03B 17/00
[52] U.S. Cl. ............................................................ 396/51
[58] Field of Search .............................. 396/51; 348/78; 351/210; 250/221

[56] References Cited

U.S. PATENT DOCUMENTS

| 5,485,241 | 1/1996 | Irie et al. ........................ 354/410 |
| 5,486,892 | 1/1996 | Suzuki et al. ................... 354/402 |
| 5,541,400 | 7/1996 | Hagiwara et al. .............. 396/51 X |
| 5,561,289 | 10/1996 | Yamada et al. ................. 250/221 |
| 5,579,080 | 11/1996 | Irie et al. ........................ 396/51 |
| 5,589,908 | 12/1996 | Irie ................................... 396/51 |
| 5,634,141 | 5/1997 | Akashi et al. . |

FOREIGN PATENT DOCUMENTS

| 4-279143 | 10/1992 | Japan . |
| 6-208158 | 7/1994 | Japan . |
| 6-308371 | 11/1994 | Japan . |

Primary Examiner—W. B. Perkey
Attorney, Agent, or Firm—Fitzpatrick, Cella Harper & Scinto

[57] ABSTRACT

A line of sight detection device detects a user's line of sight by illuminating an eyeball of a user, receiving light from the eyeball of the user, detecting a wink of the user, detecting a line of sight of the user based on a light receiving state of a light receiving means, changing at least one of an illuminating condition of an illuminating means and a light receiving condition of the light receiving means, and repeating a line of sight detecting operation based on the light receiving state of the light receiving means during the line of sight detecting operation, the line of sight detecting operation being repeated without changing the illuminating condition of the illuminating means and the light receiving condition of the light receiving means when a wink detection means detects a wink of the user during the line of sight detecting operation.

70 Claims, 25 Drawing Sheets

FIG. 3
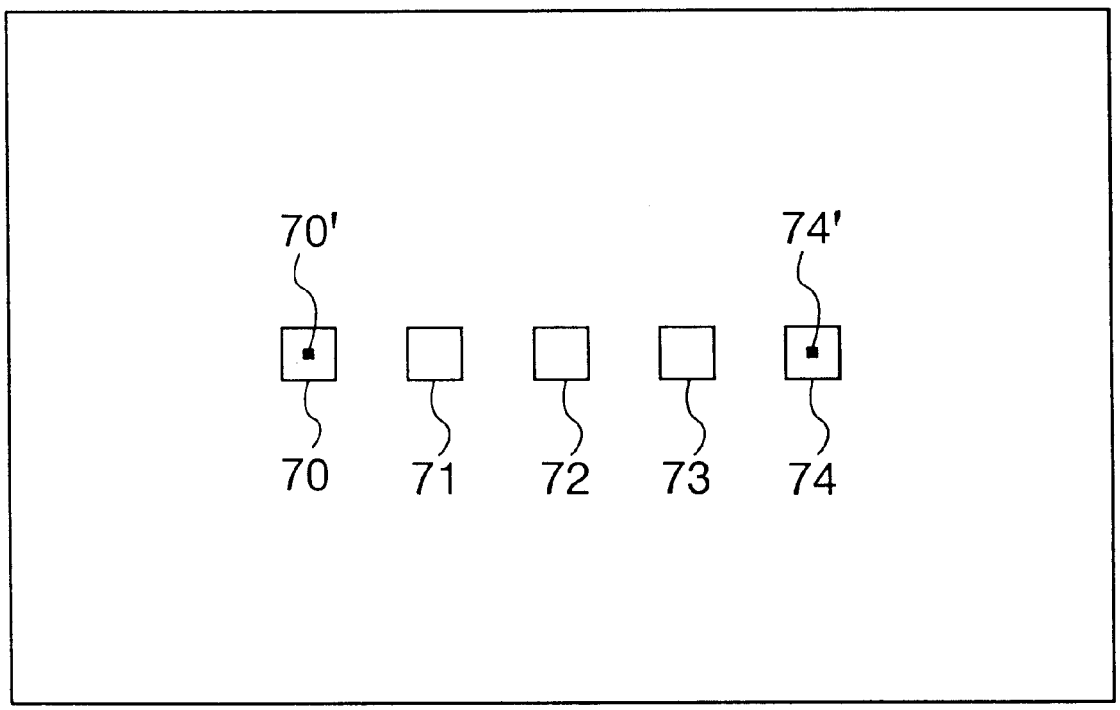
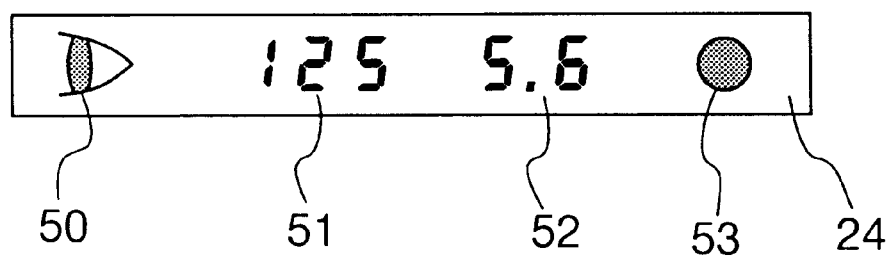

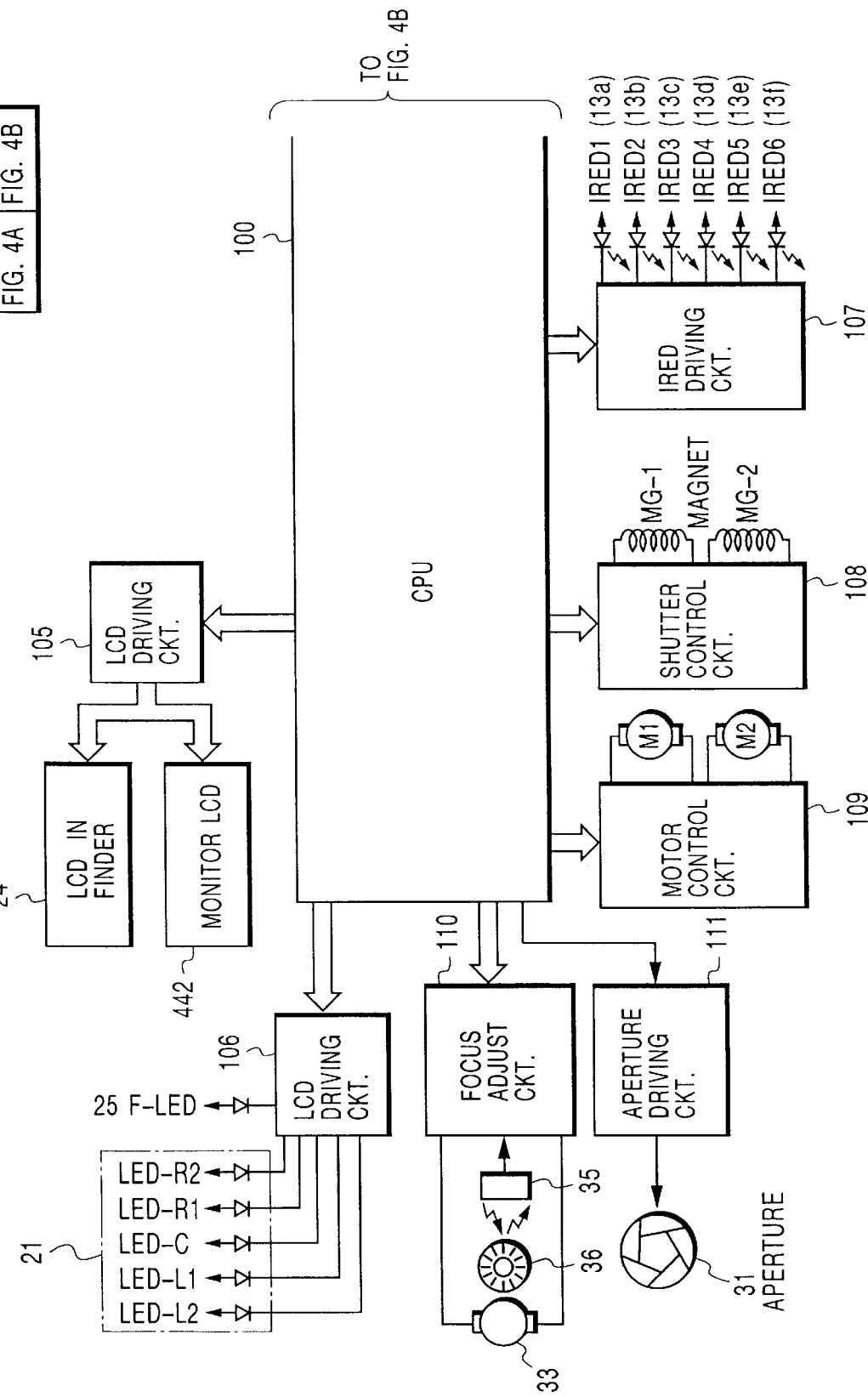

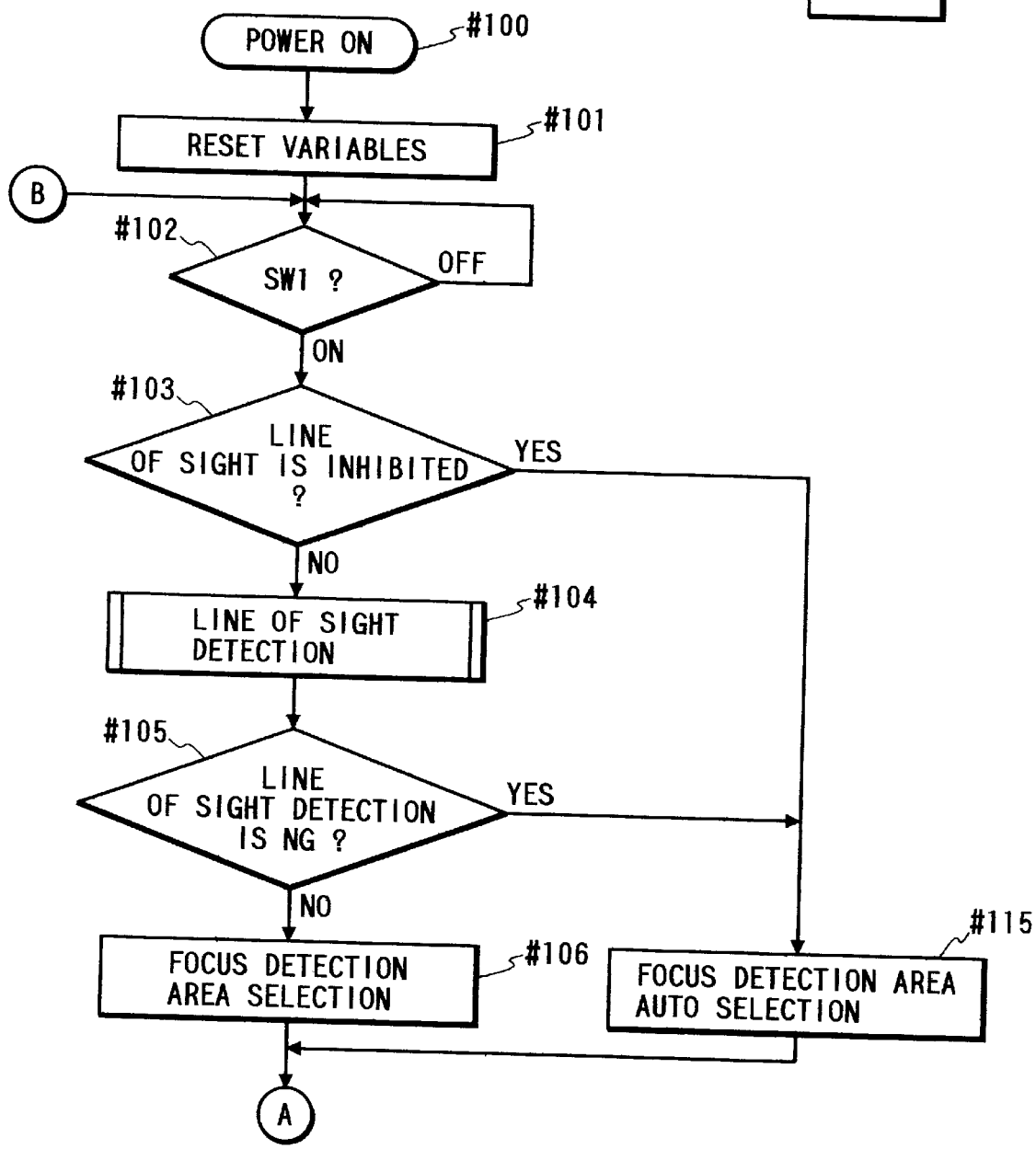

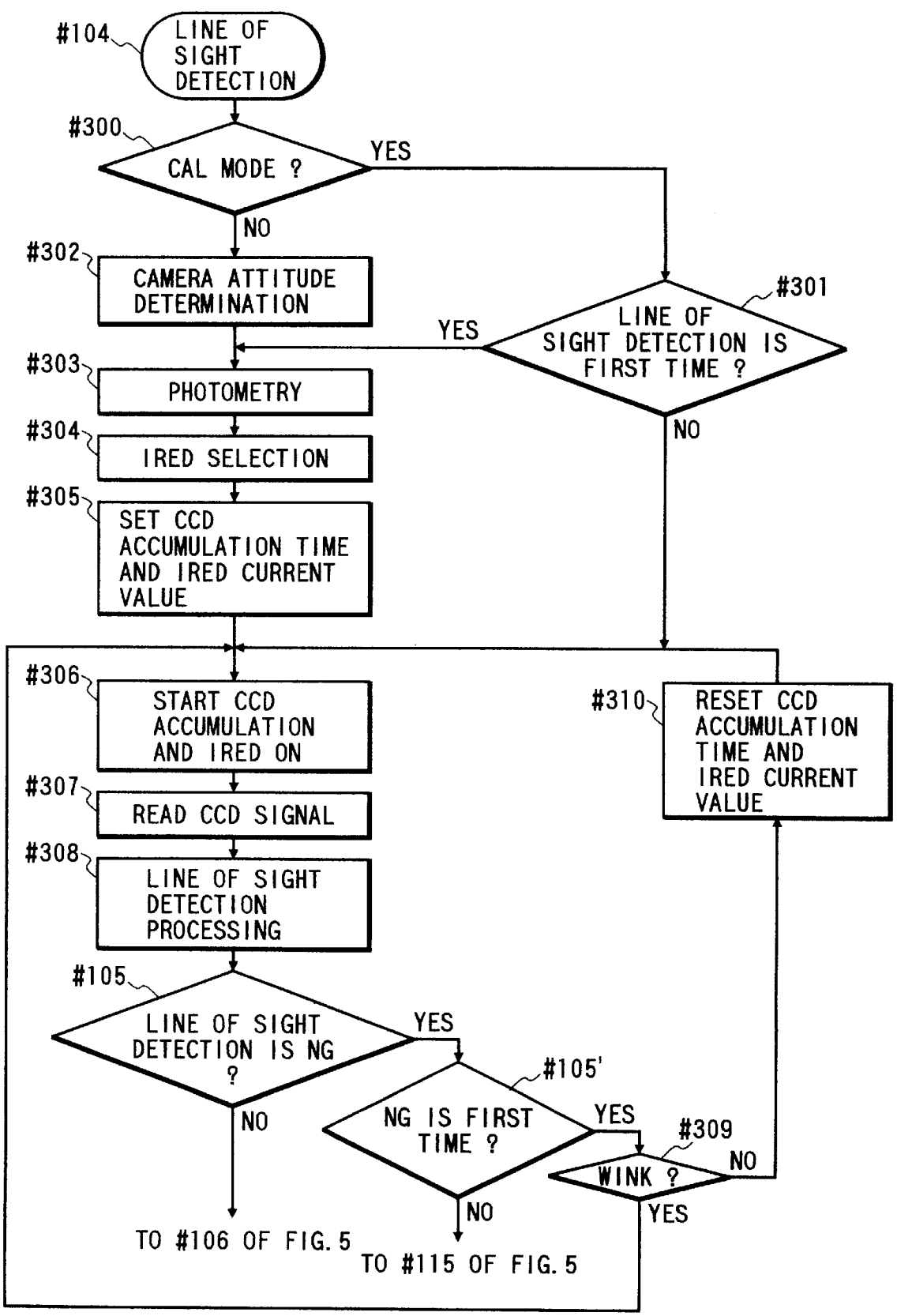

FIG. 14

| ILLUMINATION \ LUMINANCE | BV < 5 | 5 ≦ BV ≦ 8 | 8 < BV |
|---|---|---|---|
| NAKED EYES | 30 | 38 | 45 |
| GLASSES ON | 35 | 48 | 55 |

| FIG. 18A | FIG. 18B |

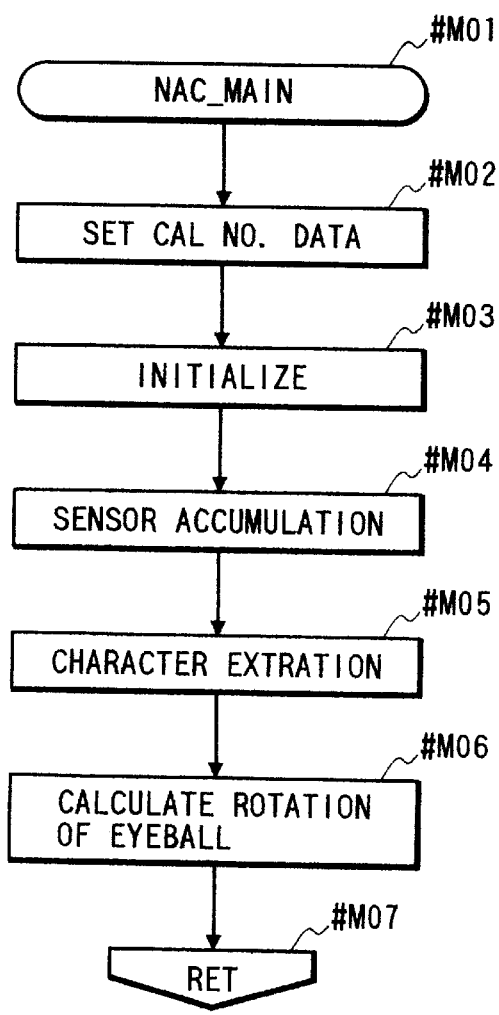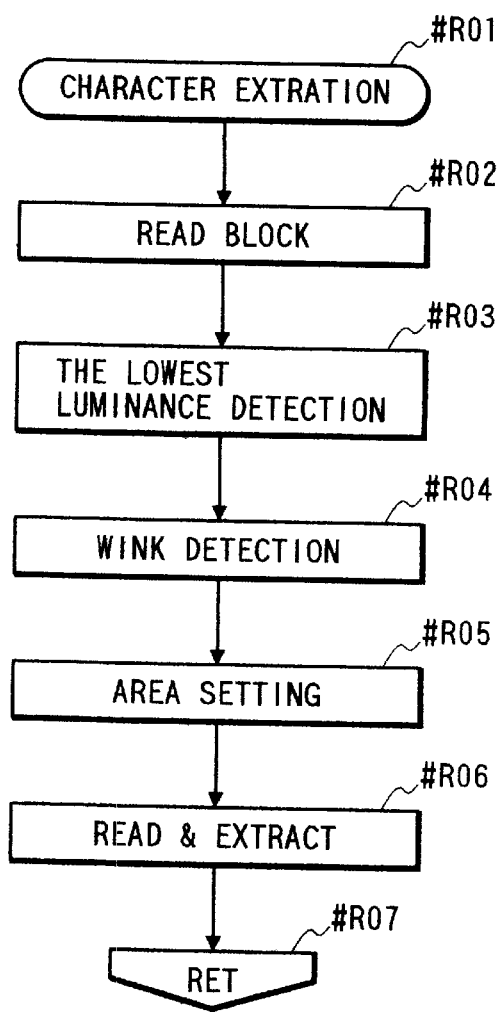

ND AN APPARATUS HAVING A LINE OF SIGHT
LINE OF SIGHT DETECTION DEVICE AND AN APPARATUS HAVING A LINE OF SIGHT DETECTION DEVICE

This application is a continuation of application Ser. No. 08/694,175 filed Aug. 8, 1996, now abandoned.

BACKGROUND OF THE INVENTION

1. Field of the Invention

The present invention relates to an apparatus having a line of sight detection means for performing a predetermined operation based on a line sight obtained by a line of sight detection device that detects a user's line of sight.

2. Related Background Art

Conventionally, there are proposed various cameras which sense a line of sight direction of a photographer (user) to detect which area (position) the photographer is observing in a viewfinder field, that is, a photographer's gazing direction by a line of sight detection means disposed in a part of the camera, and control various photographing functions such as auto focus adjustment and automatic exposure based on signals from the line of sight detection means.

For example, the applicant of this invention proposed a camera having a line of sight detection means for detecting a photographer's gazing direction and an automatic exposure control means having a distribution of a plurality of photometric sensitivities to control driving of a focus detection means or an automatic exposure control means based on an output signal from the line of sight detection means in U.S. patent application Ser. No. 08/331,154, now U.S. Pat. No. 5,486,892.

In detecting a photographer's line of sight and controlling a camera by detected signals, there is a problem of a wink (blink) which is a physiological phenomenon of human beings. There are also various proposals for detecting a "wink" to apply the information to the control. In Japanese Patent Application Laid-Open No. 6-308371, there is proposed a line of sight detection device which invalidates a result of a line of sight detection when a photographer's wink is detected.

In U.S. patent application Ser. No. 08/519,753, now U.S. Pat. No. 5,561,289 there is proposed a line of sight detection device having a capability of more precise line of sight detection; its success rate is enhanced by performing a line of sight detecting operation again after changing an illuminating position of illuminating means for illuminating an eyeball of a photographer or an illuminating output or after changing an accumulation time of an imaging element for receiving a light of an eyeball image from the eyeball or a signal amplification factor to change an image output signal of the eyeball image if it is determined that a first time line of sight detection is unsuccessful as for a problem how a subsequent line of sight detection should be controlled if the first time line of sight detection is unsuccessful due to some reason.

Furthermore, there are various proposals of controlling apparatuses by using means for detecting a user's "blink" or "wink" during the above line of sight detection or following determinations performed by the detecting means.

In Japanese Patent Application Laid-Open No. 4-279143, an eyeball movement test device is proposed for determining a testee's "wink" by comparing a total sum level of eyeball image signals with a predetermined standard value and utilizing characteristics that the total sum level of the eyeball image signals is reduced if there is a pupil image signal of a testee in the eyeball image signals of the testee while the total sum level of the eyeball image signals is increased if there is no pupil image signal.

In addition, in Japanese Patent Application Laid-Open Nos. 6-208158 and 6-308371, a camera is proposed which detects a photographer's "blink" or "wink" by illuminating an eyeball of the photographer to detect a presence or absence of a cornea reflection image of the eyeball generated by the illumination.

SUMMARY OF THE INVENTION

One aspect of this invention is a line of sight detection device for illuminating an eyeball of a user by illuminating means and for receiving a light from the eyeball of the user by light receiving means. The line of sight detection device has wink detection means for detecting a wink of the user during the line of sight detecting operation and control means for changing at least one of an illuminating condition of the illuminating means and a light receiving condition of the light receiving means and for repeating a line of sight detecting operation based on the light receiving state of the light receiving means during the line of sight detecting operation. The control means repeats the line of sight detecting operation without changing the illuminating condition of the illuminating means and the light receiving condition of the light receiving means when the wink detection means detects the wink of the user during the line of sight detecting operation.

BRIEF DESCRIPTION OF THE DRAWINGS

FIG. 3 is a diagram illustrating a sample display in a viewfinder of the camera in FIG. 1;

FIG. 8 is a flowchart of a line of sight detecting operation of a single lens reflex camera according to a second embodiment of this invention;

FIG. 14 is a diagram illustrating an example of a threshold value used for a wink determination;

FIGS. 19A and 19B are flowcharts of operations at line of sight detection of the camera in FIG. 15;

DETAILED DESCRIPTION OF THE PREFERRED EMBODIMENTS

Figure 1:
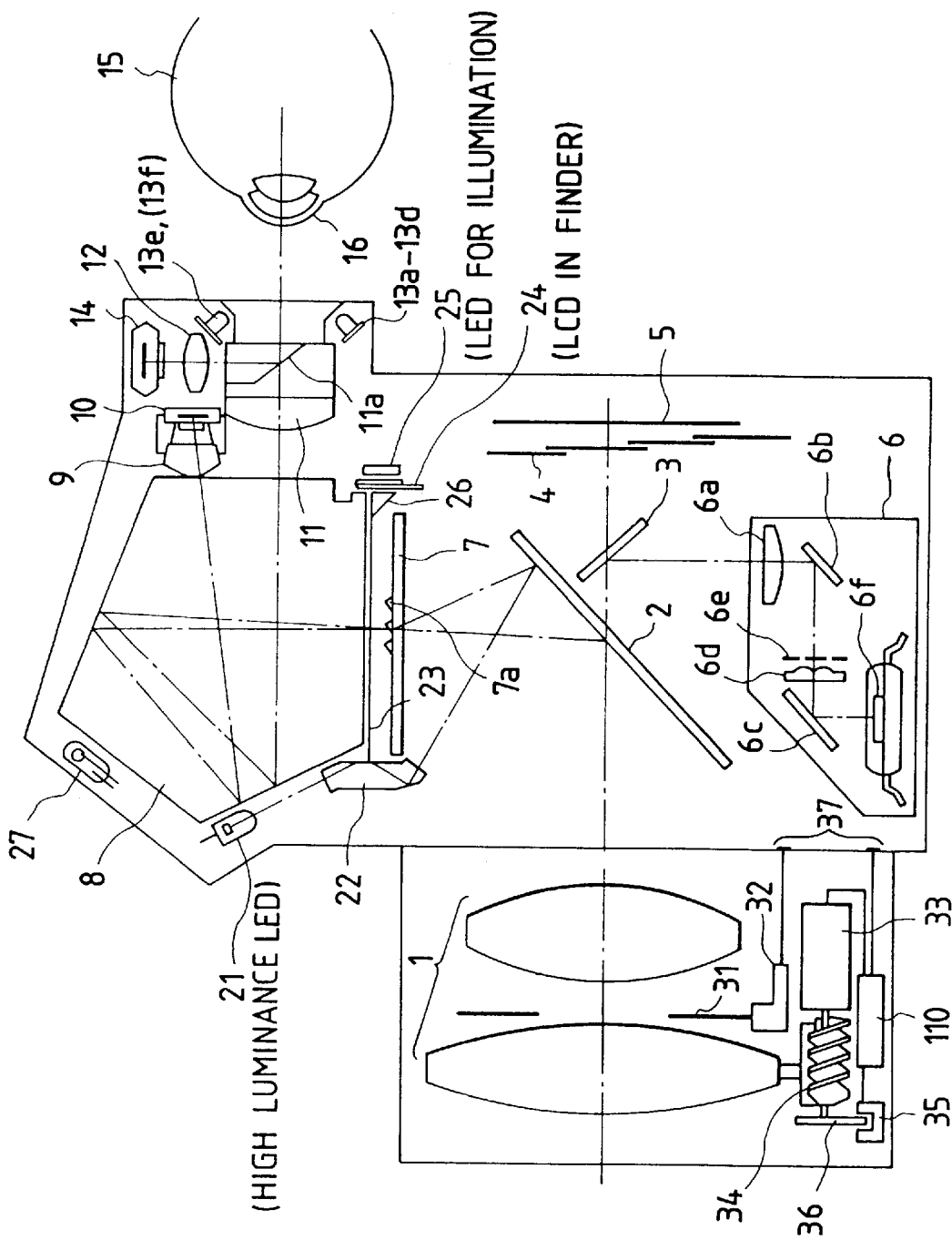
FIG. 1 is a diagram illustrating an optical arrangement of a single lens reflex camera according to a first embodiment of this invention.

This invention will be described in detail below based on embodiments shown in the drawings.

Figure 2A:
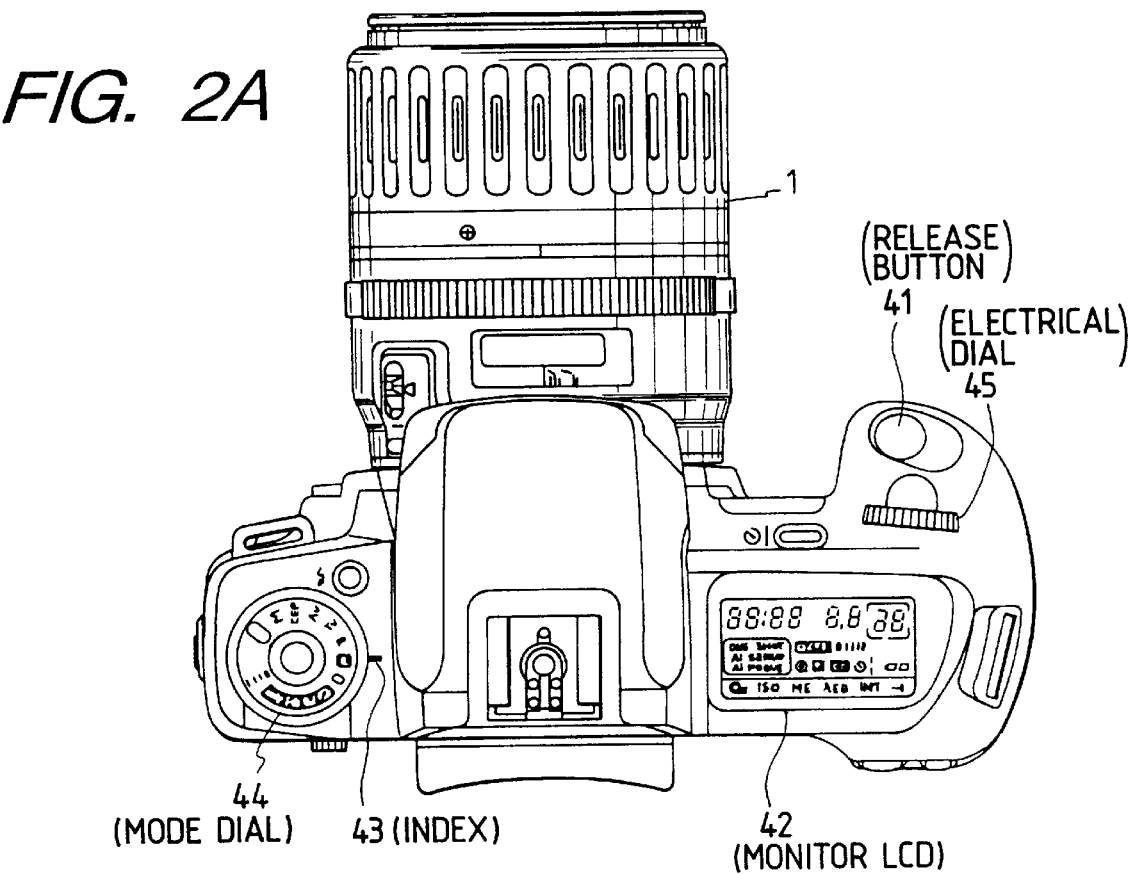
FIGS. 2A and 2B are diagrams illustrating a top view and a rear elevation of the camera in FIG. 1.
Figure 2B:
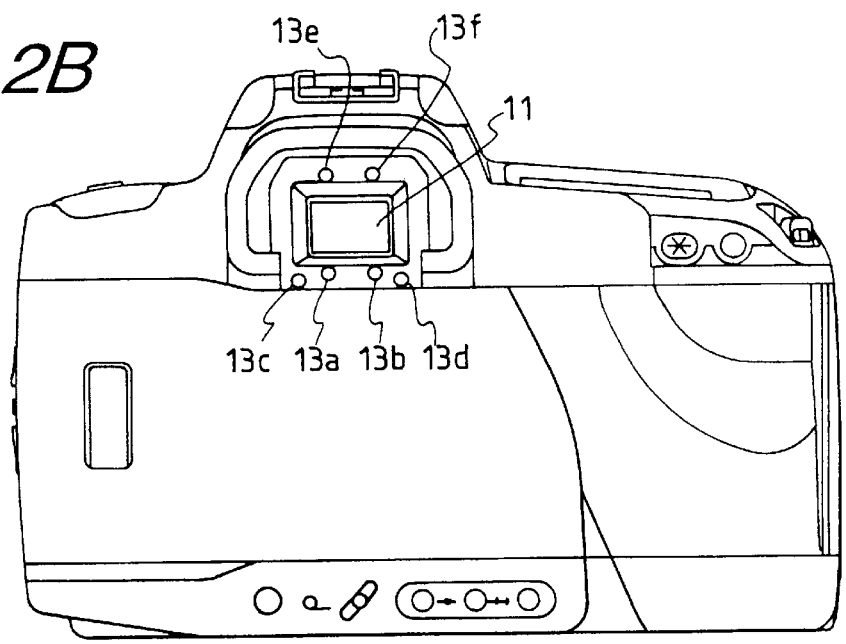

FIG. 1 is a main part configuration illustrating a first embodiment of this invention applied to a single lens reflex camera, FIGS. 2A and 2B are a top view and a rear elevation of the single lens reflex camera in FIG. 1, and FIG. 3 is a diagram illustrating a display in a viewfinder of the camera in FIG. 1.

In these drawings, a photo taking lens 1 is illustrated by using two pieces of lens for convenience, though it actually comprises more pieces. A main mirror 2 is set at an angle relative to a photographing optical path or withdrawn from it according to an observation state or a photographic state of an object image through a viewfinder system. A submirror 3 is used to reflect a flux transmitted through the main mirror 2 back into a focus detection device 6 described later at the bottom of the camera body.

There are provided a shutter 4 and a photosensitive member 5 comprising silver halide, a CCD- or MOS-typed solid imaging element or a camera tube such as a vidicon.

A focus detection device 6 comprises a field lens 6a arranged in the neighborhood of an image formation plate, reflection mirrors 6b and 6c, a secondary imaging lens 6d, an aperture 6e, and a line sensor 6f comprising a plurality of CCDs.

A focus detection device 6 of this embodiment, which detects a focus in a known phase difference detection method, has a configuration in which a plurality of areas (five places indicated by focus detection area marks 70 to 74 in FIG. 3) in a field are considered as focus detection areas (focus detection points) so that a focus state can be detected in the focus detection areas.

A focusing plate 7 is arranged on an anticipated image formation plate of the photo taking lens 1 and a pentaprism 8 is used for changing a viewfinder optical path. An image formation lens 9 and a photometric sensor 10 are used to measure luminance of an object in an observed screen. The image formation lens 9 associates the focusing plate 7 with the photometric sensor 10 via a reflection optical path in the pentaprism 8.

An eyepiece lens 11 having an optical divider 11a is arranged in the rearward side of an exit plane of the pentaprism 8 to be used for observation of the focusing plate 7 through a photographer's eye 15. The optical divider 11a is formed by, for example, a dichroic mirror which transmits visible light and reflects infrared light.

A viewfinder optical system comprises the above main mirror 2, the focusing plate 7, the pentaprism 8, and the eyepiece lens 11.

There are an image formation lens 12 and an image sensor 14 in which CCD or other photoelectric conversion elements are arranged two-dimensionally; the image formation lens 12 is arranged so that it is associated with the neighborhood of a pupil of the photographer's eyeball 15 at a predetermined position in conjugation. Infrared light emitting diodes (hereinafter, IREDs) 13a to 13f, which are illumination light sources, are arranged around the eyepiece lens 11 as shown in FIG. 2B.

A line of detection device comprises these components and the dichroic mirror 11a described above.

A light emitted from a high luminance LED for superimposing 21 which can be visually confirmed in a bright object reflects on the main mirror 2 via a prism for projection 22 and is bent at a microprism array 7a set in a display portion of the focusing plate 7 perpendicularly, then it reaches the photographer's eye 15 passing through the pentaprism 8, the eyepiece lens 11 and an opening of the eyepiece portion 17.

In other words, as shown in the viewfinder field in FIG. 3, respective focus detection areas 70 to 74 flash in the viewfinder to indicate a focus detecting area (detection point) (hereinafter, superimposing display).

In FIG. 3, inside areas of the leftmost and right-most focus detection area marks 70 and 74 are marked by dot marks 70' and 74', which are indices for collecting line of sight correction data (which is called calibration) used for correcting detection errors of line of sight caused by personal differences of respective eyeballs.

This drawing shows a shutter speed display 51, an aperture value display segment 52, a line of sight input mark 50 for indicating a line of sight input state, and an in-focus mark 53 for indicating an in-focus state of the photo taking lens 1. An LCD in a viewfinder (hereinafter, also referred to as F-LCD) 24, which is used for displaying photographing information outside the viewfinder field, is illuminated by an LED for illumination 25.

Light transmitted by the above F-LCD24 is led to an outside of the viewfinder field by a triangular prism 26, so that a photographer can achieve various photographing information as shown by 24 in FIG. 3.

Returning to FIG. 1, there are shown an aperture 31 disposed in the photo taking lens 1, an aperture driving device 32 including an aperture driving circuit 111, a motor for driving lens 33, and a lens driving member 34 comprising a driving gear. A photo coupler 35 detects a rotation of the pulse plate 36 linked with the lens driving member 34 and conveys it to a focus adjusting circuit 110. The focus adjusting circuit 110 drives the motor for driving lens 33 by a predetermined amount on the basis of this information and lens driving amount information sent from the camera to move the photo taking lens 1 to an in-focus position. A mount contact 37 serves as an interface between a known camera and lens.

An attitude detection switch 27 such as a mercury switch is used to detect whether the camera is held horizontally or vertically.

In FIGS. 2A and 2B, there is shown a release button 41. An LCD for monitoring 42 used as an external monitor display unit comprises a fixed segment display portion for displaying predetermined patterns and a 7-segment display portion for displaying variable numerals.

A mode dial 44 is used to select a photographing mode. By setting the mode dial at an index 43 marked on the camera body, a photographing mode is set in accordance with the indication. For example, there can be set a lock position for locking the camera and an automatic photographing mode position for controlling the camera by a previously set photographing program, as well as a program AE, a shutter-priority AE, an aperture-priority AE, a depth-of-field-priority AE, and a manual exposure photographing modes in a manual photographing mode in which a photographer can specify photographing contents. In addition, a calibration ("CAL") position for a line of sight input is contained in the mode dial 44. By operating an electronic dial 45 described later at the CAL position, a line of sight input can be turned on or off and a calibration can be executed or selected.

An electronic dial 45 is used to select a set value which can be further selected in the mode selected in the above mode dial 44 by being turned to generate click pulses. For example, if a shutter-priority photographing mode is selected by the mode dial 44, a currently set shutter speed is displayed on the LCD in the viewfinder 24 and the LCD for monitoring 42. If a photographer turns the electronic dial 45 looking at this display, the currently set shutter speed is sequentially changed in the rotating direction.

Description of other operation members is omitted since they are not directly related to this invention.

Figure 4B:
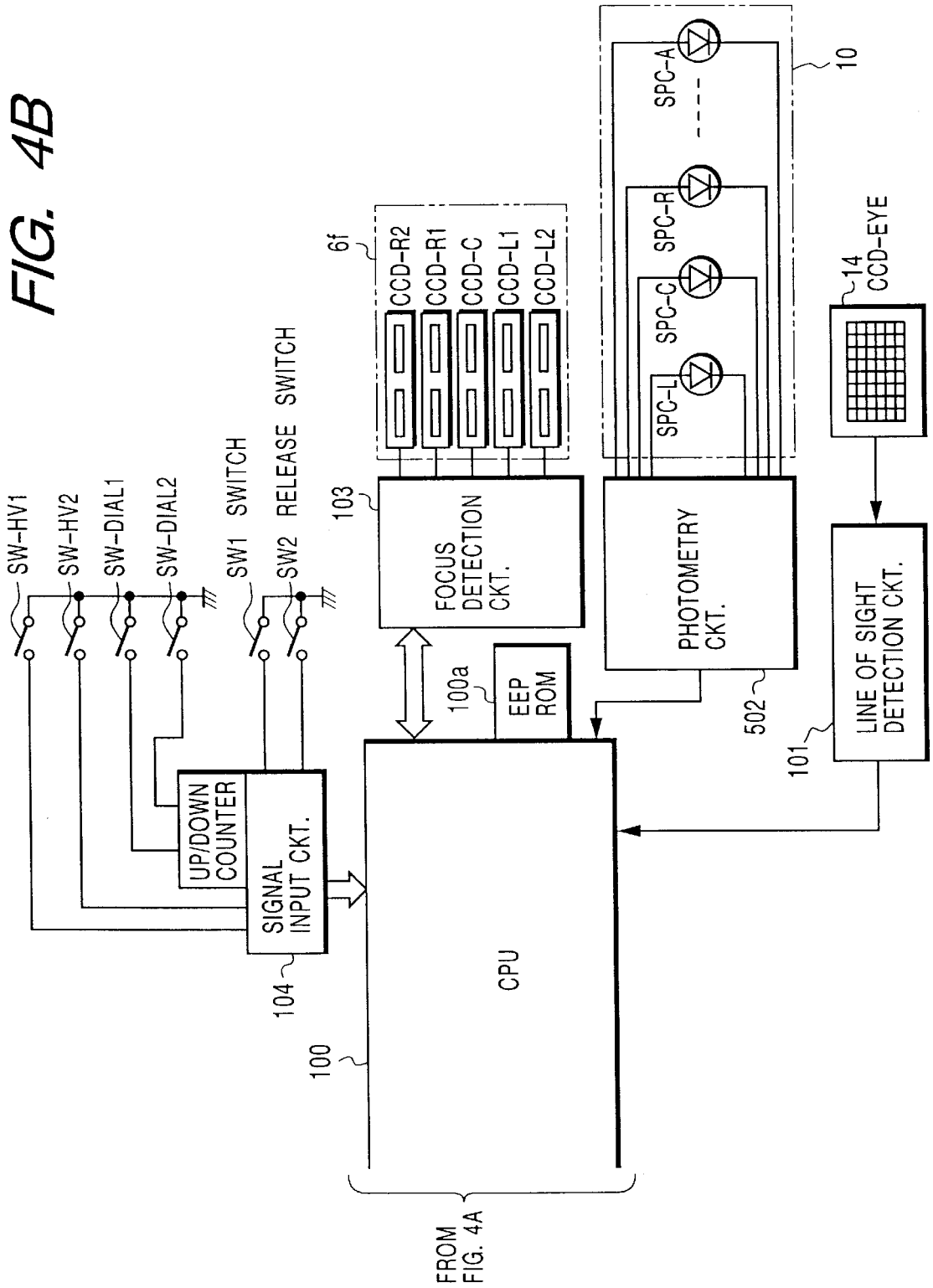
FIG. 4 is comprised of FIGS. 4A and 4B showing block diagrams illustrating an electric configuration of the camera in FIG. 1.

FIGS. 4A and 4B are block diagrams illustrating an electric configuration built in a single lens reflex camera having the above configuration. The same reference characters designate the same elements as in FIG. 1.

A central processing unit (hereinafter, CPU) 100 of a microcomputer built in the camera body is connected to a line of sight detection circuit 101, a photometry circuit 102, an auto focus detection circuit 103, a signal input circuit 104, an LCD driving circuit 105, an LED driving circuit 106, an IRED driving circuit 107, a shutter control circuit 108, and a motor control circuit 109. In addition, it transmits or receives signals to or from a focus adjusting circuit 110 arranged in the photo taking lens 1 and the aperture driving circuit 111 via the mount contact 37 in FIG. 1.

An EEPROM 100a attached to the CPU 100 has a function of storing line of sight correction data used for correcting personal differences of a line of sight.

The above line of sight detection circuit 101 converts signals of an eyeball image from the image sensor 14 (CCD-EYE) in an A/D conversion to send the image information to the CPU 100. The CPU 100 extracts characters of the eyeball image required for the line of sight detection based on a predetermined algorithm and calculates the photographer's line of sight from respective positions of the characters. In addition, the CPU 100 also determines whether or not a photographer has winked based on an output generated by the eyeball image converted in an A/D conversion.

The above photometry circuit 502 amplifies signals from the photometric sensor 10, logarithmically compresses and converts them in an A/D conversion, and sends them as luminance information of each sensor to the CPU 100. The photometric sensor 10 comprises four photodiodes of SPC-L, SPC-C, SPC-R, and SPC-A for performing a photometric operation for four areas in the viewfinder screen, so that it is possible to perform segmental photometry.

A line sensor 6f is a known CCD line sensor comprising five pairs of line sensors CCD-L2, CCD-L1, CCD-C, CCD-R1, and CCD-R2 corresponding to five focus detection areas 70 to 74 in the screen shown in FIG. 3 described above.

The auto focus detection circuit 103 converts a voltage obtained from the above line sensor 6f in an A/D conversion and then sends it to the CPU 100.

Switch SW-1 is set "" on by a first stroke of a release button 41 to start photometry, AF, and a line of sight detecting operation and switch SW-2 is a release switch which is set "on" by a second stroke of the release button 41. SW-DIAL1 and SW-DIAL2 are dial switches set in the already described electronic dial 45 with their states entered in an up/down counter of the signal input circuit 104 to count a rotation click amount of the electronic dial 45. SW-HV1 and SW-HV2 are line of sight detection switches corresponding to an attitude detection switch 27 and states of a camera attitude is detected based on their signals.

State signals of these switches are entered into the signal input circuit 104 and transmitted to the CPU 100 via a data bus.

The LCD driving circuit 105 has a known configuration for driving an LCD which is a liquid crystal element for displaying, so that an aperture value, a shutter second time, and set photographing mode can be displayed on both of the LCD for monitoring 42 and the LCD in the viewfinder (F-LCD) 24 simultaneously according to signals from the CPU 100.

The LED driving circuit 106 controls turning on or off and blinking of the LED for illumination (F-LED) 25 and the LED for superimposing 21. The above IRED driving circuit 107 selectively turns on infrared light emitting diodes (IRED-1 to IRED-6) 13a to 13f or controls illumination power by changing an output current value (or the number of pulses) to infrared light emitting diodes (IRED-1 to IRED-6) 13a to 13f following instructions of the CPU 100.

The shutter control circuit 108 controls a magnet MG-1 for running a forward shutter curtain and a magnet MG-2 for running a rearward shutter curtain when they are energized, so as to expose a photosensitive member by a predetermined light amount. The motor control circuit 109 is used to control a motor M1 for advancing or rewinding a film and a motor M2 for charging the main mirror 2 and the shutter 4.

A series of release sequence operations of the camera is performed by these shutter control circuit 108 and motor control circuit 109.

Figure 5B:
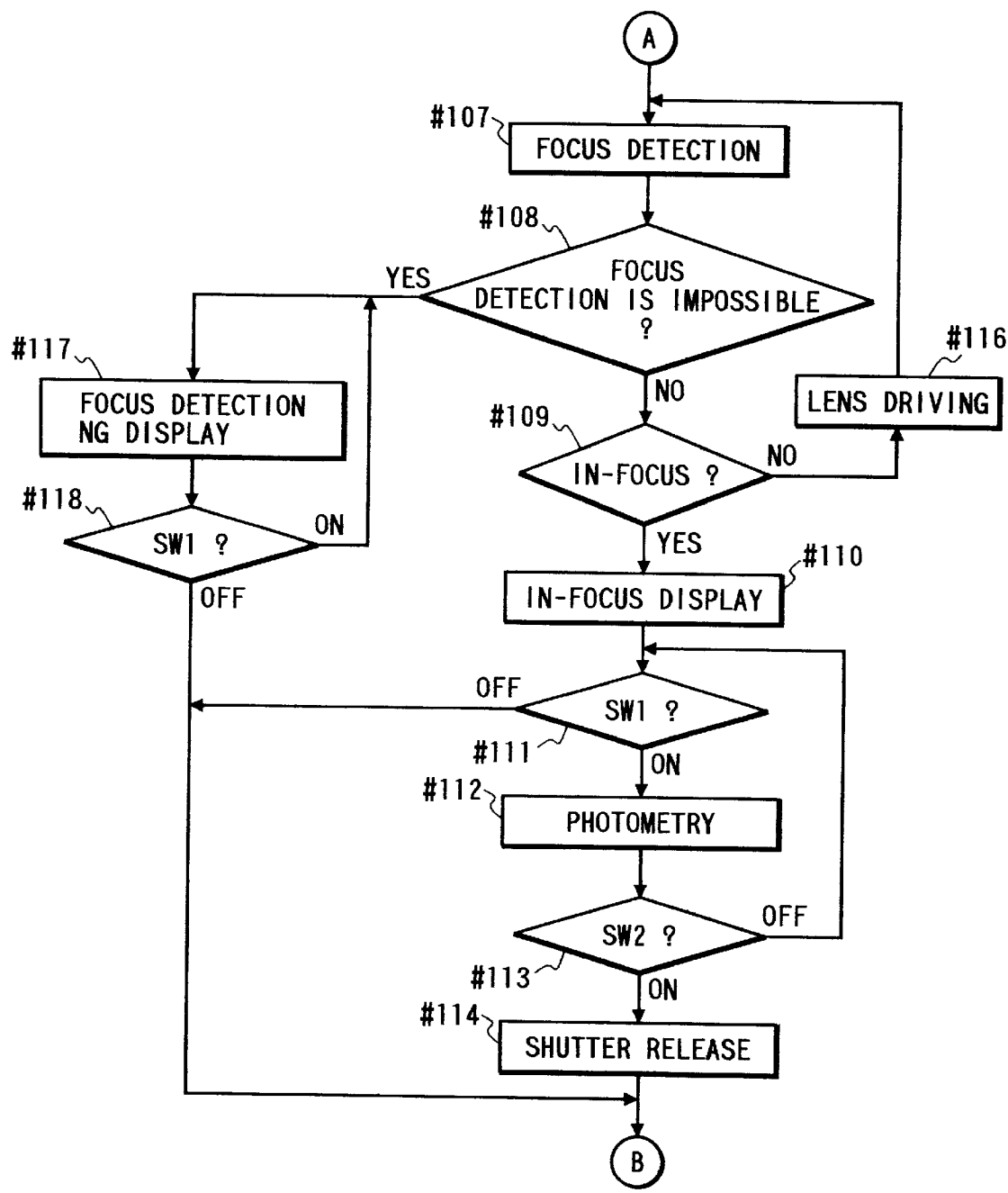
FIG. 5 is comprised of FIGS. 5A and 5B showing flowcharts of a series of operations of the camera in FIG. 1.

The following describes an operation of a camera having a line of sight detection device by using flowcharts in FIGS. 5A and 5B.

If a locked camera is set into the photographing mode by turning the mode dial 44 (in this embodiment, an operation is described based on a camera set to the shutter-priority AE), the camera is powered on (step #100) to reset variables used for line of sight detection other than calibration data of line of sight stored in the EEPROM 100a of the CPU 100 (step #101). Then, the camera enters a standby state until the switch SW1 is turned on by pressing the release button 41 (step #102).

If the signal input circuit 104 detects that the switch SW1 is turned on by pressing the release button 41, the CPU 100 asks the line of sight detection circuit 101 which calibration data is used for line of sight detection (step #103). If calibration data of the confirmed calibration data number is an initial value without any change or a line of sight inhibition mode is set (step #103), a specific focus detection area is selected by a focus detection area automatic selection subroutine without executing the line of sight detection, that is, without using line of sight information (step #115). Then, at this focus detection area, the auto focus detection circuit 103 performs a focus detecting operation (step #107).

Although there are some methods as an algorithm for focus detection area automatic selection, there is an effective periapsis-priority algorithm in which a center focus detection area is weighted, known for a multiple point AF camera.

If the above described calibration data of a line of sight corresponding to the calibration data number is set to a predetermined value and it is recognized that the data is entered by a photographer (step #103), the line of sight detection circuit 101 executes the line of sight detection based on the calibration data and the line of sight is converted to coordinates of a gazing point on the focusing plate 7 (step #104).

Next, it is determined whether or not the line of sight information detected in the above step #104 is successful (step #105). Conditions on the determination are a Purkinje image which is a cornea reflection image, reliability of a center position of a pupil, and a rotation angle of an eyeball. If it is unsuccessful, processing proceeds to the "focus detection area automatic selection subroutine" in step #115. If it is successful, the CPU 100 selects a focus detection area close to the coordinates of the gazing point (step #106). After that, the auto focus detection circuit 103 executes focus detection at the focus detection area selected by using the line of sight information which is detected (step #107).

Then, it is determined whether or not it is possible to measure a distance to the selected focus detection area in the above (step #108). If it is impossible, the CPU 100 transmits a signal to the LCD driving circuit 105 to blink an in-focus mark 79 of the LCD in the viewfinder 24 in order to warn a photographer of an unsuccessful focus detection (step #117), and the warning is continued until the switch SW1 is turned off (step #118→#117→#118 - - - ).

If focus detection is successful and an in-focus state is not detected for a focus adjustment state of the focus detection area selected based on a predetermined algorithm (step #109), the CPU 100 transmits a signal to the lens focus adjustment circuit 110 to drive the photo taking lens 1 by a predetermined amount (step #116). After driving the lens, the auto focus detection circuit 103 performs focus detection again (step #107) to determine whether or not the photo taking lens 1 is in an in-focus state (step #109).

If the photo taking lens 1 is in an in-focus state at a predetermined focus detection area, the CPU 100 transmits a signal to the LCD driving circuit 105 to turn on an in-focus mark 53 on the LCD in the viewfinder 24 and to turn on the LED for superimposing 21 corresponding to a focus detection area in an in-focus state so as to light the focus detection area for in-focus displaying (step #110).

If a photographer, looking at the in-focus focus detection area displayed in the viewfinder, stops pressing the release button 41 when he or she determines that the focus detection area is not correct or that the photographing is stopped and the switch SW1 is turned off (step #111), subsequently the control of the camera returns to step #102 in which it is put in a standby state until the switch SW1 is turned on.

If the photographer, looking at the in-focus focus detection area displayed, continues to turn on the switch SW1 (step #111), the CPU 100 transmits a signal to the photometry circuit 102 to perform photometry (step #112).

At this time, an exposure value is calculated by weighting a photometric area including the in-focus focus detection area. In this embodiment, an aperture value (F5.6 designated by 52 in FIG. 3) is displayed by using a segment and a decimal point as a result of the photometric calculation.

Furthermore, it is determined whether or not the switch SW2 is in an on state by the pressed release button 41 (step #113). If the switch SW2 is in an off state, a state of the switch SW1 is checked again (step #111).

If the switch SW2 is in an on state, the CPU 100 transmits a signal to the shutter control circuit 108, the motor control circuit 109, and the aperture driving circuit 111 to perform a known shutter release operation (step #114).

The CPU 100 energizes the motor M2 to raise the main mirror 2 via the motor control circuit 109, adjusts the aperture 31, and energizes the magnet MG1 to release a forward curtain of the shutter 4. An aperture value of the aperture 31 and a shutter speed of the shutter 4 are determined based on an exposure value detected by the above described photometry circuit 102 and a sensitivity of a film 5. After an elapse of a predetermined shutter second time ($1/125$ sec), the CPU energizes the magnet MG2 to close the rearward curtain of the shutter 4. After completion of an exposure of the film 5, it energizes the motor M2 again for mirror down and shutter charging operations and also energizes the motor M1 for film feeding to advance the film and then completes a series of the shutter release sequence operations.

After that, the camera is put in a standby state until the switch SW1 is turned on again (step #102).

If a mode is changed by the mode dial 44 during a series of operations other than the shutter release operation (step #114) of the camera in FIG. 5B and the signal input circuit 104 detects that it is set to the calibration mode of a line of sight, the CPU 100 temporarily stops the operation of the camera and transmits a signal to the line of sight detection circuit 101 to set a state ready for line of sight calibration (step #115).

As for a line of sight calibration method, a photographer gazes at each of the rightmost dot mark 74' and the leftmost dot mark 70' of focus detection areas in the viewfinder field for a certain time and extracts line of sight correction data from eyeball image data obtained from the gazing. Detailed description of the method is omitted here since it is not directly related to this invention.

Figure 6:
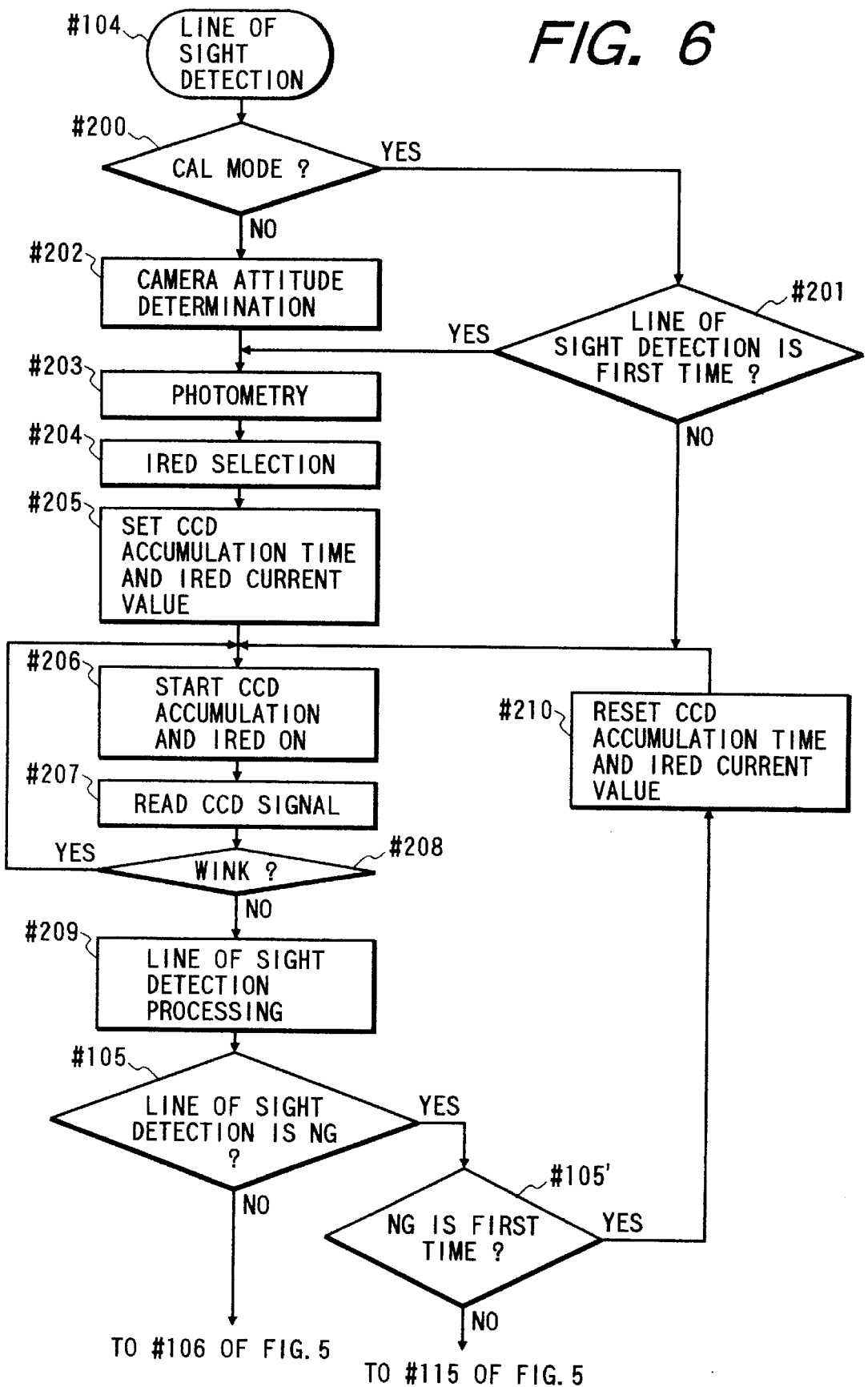
FIG. 6 is a flowchart of a line of sight detecting operation of the camera in FIG. 1.

FIG. 6 is a flowchart of a line of sight detecting operation.

In FIG. 6, the line of sight detection circuit 101 executes a line of sight detecting operation when receiving a signal from the CPU 100 as described in the above (step #104). The line of sight detection circuit 101 determines whether or not the line of sight detection is performed in the photographing mode or in the line of sight calibration mode (step #200). At the same time, the line of sight detection circuit 101 recognizes which calibration data number described later the camera is set to.

The line of sight detection circuit 101 detects what attitude the camera is put in via the signal input circuit 104 for the line of sight detection in the photographing mode (step #202), first. The signal input circuit 104 determines whether or not the camera is put in a horizontal direction or in a vertical direction by processing an output signal of the mercury switch 27 (SW-ANG). If it is put in a vertical direction, it is determined, for example, whether or not the release button 41 faces the top or bottom.

Subsequently, the signal input circuit obtains information about the brightness of photographing areas from the photometry circuit 102 via the CPU 100 (step #203).

Next, an infrared light emitting diode (hereinafter, IRED) 13a to 13f is selected based on the camera attitude information which has been detected and photographer glasses information included in the calibration data (step #204).

In other words, if the camera is put in a horizontal orientation and the photographer does not wear glasses, IREDs 13a and 13b of the viewfinder optical axis shown in FIG. 2B are selected. If the camera is put in a horizontal orientation and the photographer wears glasses, IREDs 13c and 13d of the viewfinder optical axis are selected. Since a part of the illumination light reflected on the glasses of the photographer reaches the outside of a predetermined area on the image sensor 14 on which an eyeball image is projected, it does not cause any trouble in the analysis of the eyeball image.

If the camera is put in a vertical orientation, either combination IREDs 13a and 13e or IREDs 13b and 13f is selected so that a photographer's eyeball is illuminated from below.

Next, an accumulation time of the image sensor 14 (hereinafter, CCD-EYE) and an illumination power of the IREDs are set based on the photometric information and the photographer glasses information (step #205). The accumulation time of the CCD-EYE 14 and the IRED illumination power can be set based on values determined from contrast information of the eyeball image obtained at the last time line of sight detection.

When the accumulation time of the CCD-EYE 14 and the illumination power of the IREDs are set, the CPU 100 turns on the IRED 13 with a predetermined power via the IRED driving circuit 107 and the line of sight detection circuit 101 starts an accumulation of the CCD-EYE 14 (step #206). The accumulation is terminated according to the accumulation time of the CCD-EYE 14 which has been previously set, and the IRED 13 is also turned off.

If it is determined that the calibration mode is set in step #200 and it is determined that the current line of sight detection is a second or subsequent line of sight detection in the calibration mode in step #201, the last time values are applied to the accumulation time of the CCD-EYE 14 and the illumination power of the IREDs to start turning on the IRED 13 and accumulation of the CCD-EYE 14 immediately (step #206).

Next, image signals accumulated by the CCD-EYE 14 are sequentially read out and converted in an A/D conversion by the line of sight detection circuit 101, and then they are stored in the CPU 100 (step #207).

It is determined whether or not the photographer has winked by processing the image signals stored in the memory (step #208).

As for determination conditions of whether the photographer has winked, a cornea reflection image signal in the image signals of the CCD-EYE 14 is used.

Figure 7A:
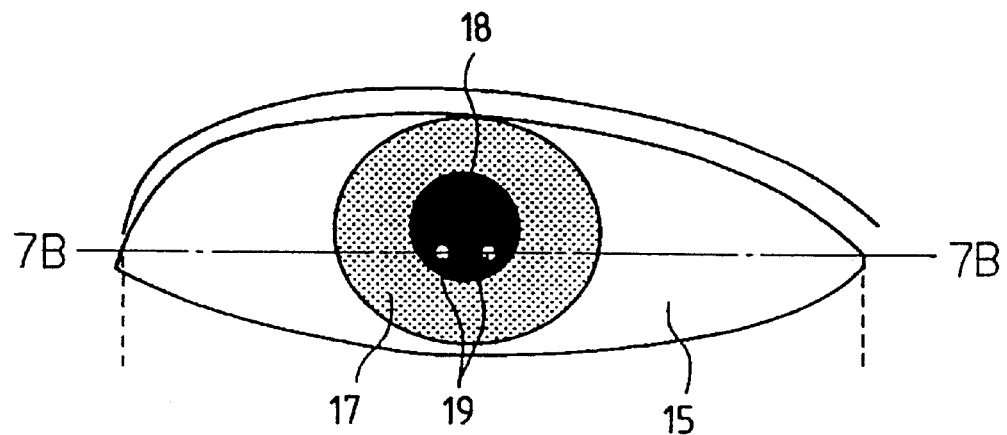
FIGS. 7A and 7B are diagrams for describing wink determination in the camera in FIG. 1.

FIG. 7A illustrates an image formed based on an eyeball image signal of the CCD-EYE 14. On the cornea of the eyeball 15, a cornea reflection image (hereinafter, Purkinje image) 19 is generated due to light emitting of the IRED 13. In this drawing, there are also shown an iris 17 and a pupil 18.

Figure 7B:
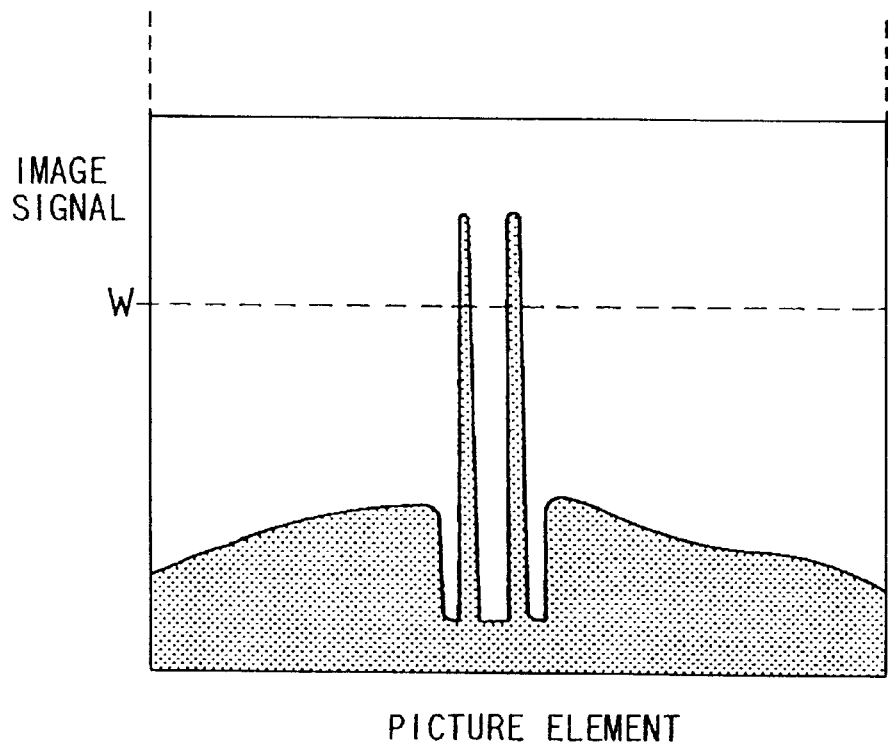
Figure 9A:
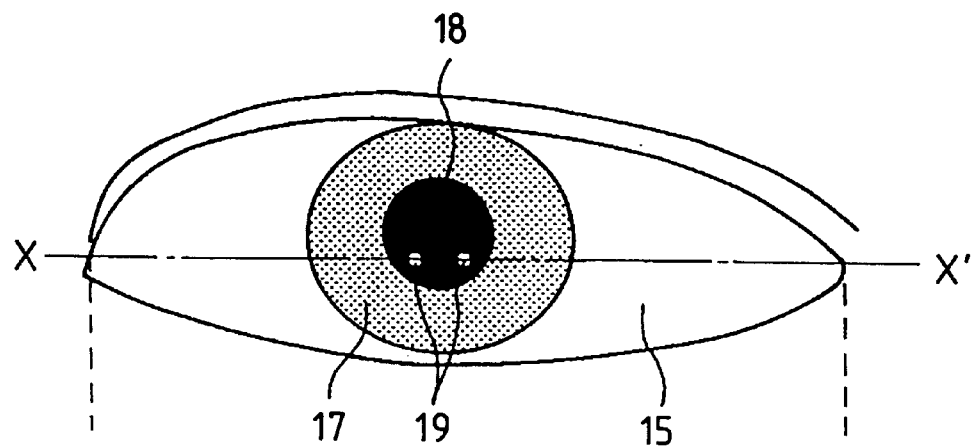
FIGS. 9A and 9B are diagrams for description at wink determination in the camera in FIG. 1.
Figure 9B:
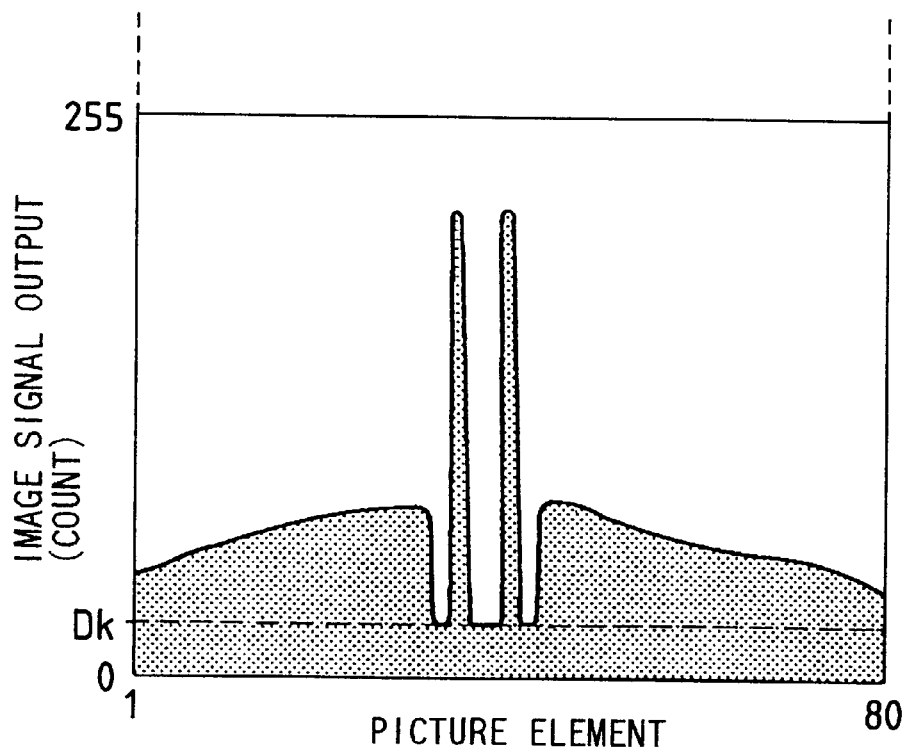

FIG. 7B shows image signals in a cross section taken on line 7B—7B in FIG. 7A including the Purkinje image 19 in these image signals. As shown in this drawing, the Purkinje image 19 generates the highest output in the eyeball image signals. If the highest output in the image signals is, for example, lower than a specific value W, it is determined that the Purkinje image 19 does not exist because the photographer has winked.

If it is determined that the photographer has winked, the control returns to the step #206 to perform an accumulation control of the CCD-EYE 14 (in this case, an accumulation time and signal amplification characteristics) and a light emitting control of the IRED 13 (in this case, light-emitting IRED selection and a current value) under the same conditions as for the last time line of sight detection again so as to obtain an eyeball image signal of a state in which the photographer does not wink. At this time, the eyeball image signal in a winking state obtained at the last time is replaced by a new eyeball image signal accumulated in the CCD-EYE 14.

In other words, an unsuccessful line of sight detection is caused by mainly two reasons. One is inappropriate parameters of the CCD or IRED, which generates an incorrect eyeball image, and the other is a user's wink during a line of sight detecting operation, which also generates an incorrect eyeball image. If a line of sight detection is unsuccessful due to the former, it is effective to change the parameters of the CCD or IRED based on the obtained eyeball image. If the detection is unsuccessful due to the latter, however, it is not effective to change the parameters of the CCD or IRED indiscriminately since the parameters are likely to be appropriate only if the user does not wink. Therefore, if an unsuccessful line of sight detection is caused by a user's wink, a line of sight is detected again under the same conditions as for the previous unsuccessful detection without changing the parameters of the CCD or IRED.

If it is determined that the photographer does not wink by the wink determination in step #208, known line of sight detection processing is performed (step #209).

In other words, the CPU 100 detects a position of the Purkinje image 19 which is a virtual image of an IRED 13 pair used for illuminating the eyeball.

As described above, since the Purkinje image 19 appears as bright points having a high light intensity, it can be detected by setting a predetermined threshold value for a light intensity to consider a signal having a light intensity exceeding the threshold value as the Purkinje image 19. In addition, a center position of the pupil is calculated by detecting a plurality of border points between the pupil 18 and the iris 17 and obtaining least square approximation of a circle based on respective border points. A rotation angle θ is obtained for the eyeball from the position of the Purkinje image and the center position of the pupil; further, a distance between an eyepiece lens 11 of the camera and the photographer's eyeball 15 is calculated from an interval between the two Purkinje images 19 so as to achieve an image formation magnification β of the eyeball image projected on the CCD-EYE 14.

Accordingly, as described above, coordinates of a position on the focusing plate 7 in the photographer's line of sight direction can be obtained by using a rotation angle θ of an eyeball, an image formation magnification β of the eyeball image, and personal difference correction information obtained in the calibration.

Returning to FIGS. 5A and 5B, it is determined whether or not the line of sight information is reliable based on the photographer's line of sight position (step #105). In this embodiment, a line of sight detection is considered to be unsuccessful due to some reason if the photographer's line of sight position obtained in the above procedure is located outside of the visual field of the focusing plate 7.

If it is determined that the line of sight detection is successful, then control returns to the focus detection area selection in the step #106 in the above FIG. 5A. If it is determined that the line of sight detection is unsuccessful, the number of the failures of the detection is checked after that (step #105). If the failure is found to be for the first time line of sight detection in this step, a control different from the control of the first time CCD-EYE 14 and IRED 13 which has resulted in failure is performed.

For example, if IREDs 13a and 13b for naked eyes are selected and used for illumination with the camera held in a horizontal direction at the first time, IREDs 13c and 13d for glasses are selected as IRED 13 without changing an accumulation time of the CCD-EYE 14 and its gain at the second time. If the first time detection is controlled by the IREDs 13c and 13d for glasses, an accumulation time of the CCD-EYE 14 is re-set to a twofold time period without changing the IRED selection at the second time (step #210).

After a completion of re-setting the CCD-EYE 14 and IRED 13, a CCD-EYE 14 accumulation control is performed again to obtain an eyeball image in the step #206. If it is determined that the line of sight detection has resulted in failure (in the step #105) twice in the step #105', then control returns to the focus detection area automatic selection in step #115 in FIG. 5A.

Second Embodiment

FIG. 8 is a flowchart of a line of sight detecting operation of a camera according to a second embodiment of this invention, and the operation is described below by using this drawing. Description and related drawings of an optical arrangement and an electric configuration are omitted since they are the same as for the first embodiment in the above.

In the flowchart in FIG. 8, an improvement has been made on the flowchart of the line of sight detecting operation in FIG. 6 which is described in the first embodiment so that a line of sight detecting operation is smoothly performed even if a wink determination is not so reliable by performing the wink determination after it is determined that the line of sight detection is unsuccessful in a line of sight detection success/failure determination.

Although the operation is started from step #300 via the step #104, a description of steps #300 to #307 is omitted since it is quite the same as for the steps #200 to #207 in FIG. 6.

If an eyeball image signal of a photographer holding the camera is read out from the CCD-EYE 14 to the CPU 100 in step #307, the line of sight detection processing is performed by using the eyeball image signal immediately (step #308) and it is determined whether or not the line of sight information is reliable based on the line of sight position of the photographer obtained in the line of sight detection processing (step #105). If it is determined that the line of sight detection is successful in the reliability determination, the control returns to the focus detection area selection in the step #106 in FIG. 5A described above. If it is determined, however, that the line of sight detection is unsuccessful, the number of failures of the line of sight detection is checked (step #105'). If the line of sight detection has resulted in failure twice repeatedly, it is determined that the line of sight detection cannot be performed and the control returns to the focus detection area automatic selection in the step #115 in FIG. 5A.

If the number of failures of the line of sight detection is one, that is, the detection has resulted in failure for the first time, a wink determination is performed at this point. A condition on the determination is whether or not there is a Purkinje image 19 in eyeball signals in the same manner as for the first embodiment (step #309). If it is determined that the photographer has winked, the control returns to the step #306 to perform an accumulation control (in this case, an accumulation time and gain) of the CCD-EYE 14 and an IRED 13 control (in this case, IRED selection and a current value) again under the same conditions as for the last time line of sight detection and to obtain an eyeball image signal in a state that the photographer is not winking. At this time, the image signal obtained in the last time detection is replaced by a new image signal accumulated by the CCD-EYE 14.

If it is determined that the photographer has not winked by the wink determination in is step #309, is a control different from the control of the CCD-EYE 14 and IRED 13 which has resulted in failure at the first time (step #310) is performed. It is also the same as for the first embodiment (step #210 in FIG. 6). After completion of resetting the CCD-EYE 14 and IRED 13, an accumulation control of the CCD-EYE 14 is performed to obtain an eyeball image again in step #306.

According to the above embodiments, if it is determined that the photographer has winked as a result of determining whether or not the photographer who is contacting his or her eye with the viewfinder has winked during a line of sight detection, an image fetching control for performing a next line of sight detection, that is, an accumulation time of the CCD-EYE 14, gain or IRED 13 selection, and a current value are controlled by the same control as for the last time detection in which the photographer has winked. Therefore, since a stable eyeball image signal of the photographer can be obtained even if the photographer winks during a line of sight detection, it is possible to provide a line of sight detection device having a high precision and a high success rate of a line of sight detection.

A line of sight detection processing is simply described below.

Referring to FIG. 7A, there is shown an eyeball image signal of the CCD-EYE 14 and a cornea reflection image (hereinafter, a Purkinje image) 19 generated on a cornea of an eyeball 15 by light emitted from the IRED 13, in addition to an iris 17 and a pupil 18.

FIG. 7B shows image signals in a cross section taken on line X-X' including the Purkinje image 19 in these image signals. In this drawing, a vertical axis indicates values digitized from analog signals of the CCD-EYE 14 having max. 255 count and a horizontal axis indicates data having 80 picture elements in a horizontal direction in FIG. 7A.

The CPU 100 detects a position of the Purkinje image 19 which is a virtual image of a pair of IREDs 13 used for illuminating the eyeball. As shown in FIG. 7B, the Purkinje image 19 appears as bright points having a high light intensity, it can be detected by setting a predetermined threshold value for a light intensity to consider a signal having a light intensity exceeding the threshold value as the Purkinje image 19. In addition, a center position of the pupil is calculated by detecting a plurality of border points between the pupil 18 and the iris 17 and obtaining least square approximation of a circle based on respective border points.

A rotation angle $\theta$ is obtained for the eyeball from the position of the Purkinje image and the center position of the pupil, and further a distance between an eyepiece lens 11 of the camera and the photographer's eyeball 15 is calculated from an interval between the two Purkinje images 19 so as to achieve an image formation magnification $\beta$ of the eyeball image projected on the CCD-EYE 14.

Accordingly, as described above, coordinates of a position on the focusing plate 7 in the photographer's line of sight direction can be obtained by using a rotation angle $\theta$ of an eyeball, an image formation magnification $\beta$ of the eyeball image, and personal difference correction information obtained in the calibration.

Returning to FIGS. 5A and 5B, it is determined whether or not the line of sight information is reliable based on the photographer's line of sight position (step #105). In this embodiment, a line of sight detection is considered to be unsuccessful due to some reason if the photographer's line of sight position obtained in the above procedure is located outside of the visual field of the focusing plate 7.

If it is determined that the line of sight detection is successful, the control returns to the focus detection area selection in the step #106 in the above FIG. 5A. If it is determined that the line of sight detection is unsuccessful, the number of failures of the detection is checked (step #105). If the failure is found to be the first time line of sight detection in this step, a control different from the first time control of the CCD-EYE 14 and IRED 13 which has resulted in failure is performed.

For example, if IREDs 13a and 13b for naked eyes are selected and used for illumination with the camera held in a horizontal direction at the first time, IREDs 13c and 13d for glasses are selected as IRED 13 without changing an accumulation time of the CCD-EYE 14 and its gain at the second time. If the first time detection is controlled by the IREDs 13c and 13d for glasses, an accumulation time of the CCD-EYE 14 is re-set to a twofold time period without changing the IRED selection at the second time (step #210).

After a completion of re-setting the CCD-EYE 14 and IRED 13, a CCD-EYE 14 accumulation control is performed again to obtain an eyeball image in the step #206. If it is determined that the line of sight detection has resulted in failure (in the step #105) twice in the step #105', then control returns to the focus detection area automatic selection in the step #115 in FIG. 5A.

Third Embodiment

Description is made below for a determination method of whether or not a photographer has winked with an enhanced reliability due to improvement of the above method, by using FIGS. 10 to 14.

A basic concept of this wink determination method is to determine whether or not the photographer has winked by comparing a lowest value with a threshold value depending on environmental conditions during a line of sight detection, assuming that a pupil of the photographer has the lowest value of the eyeball image signals.

Figure 10:
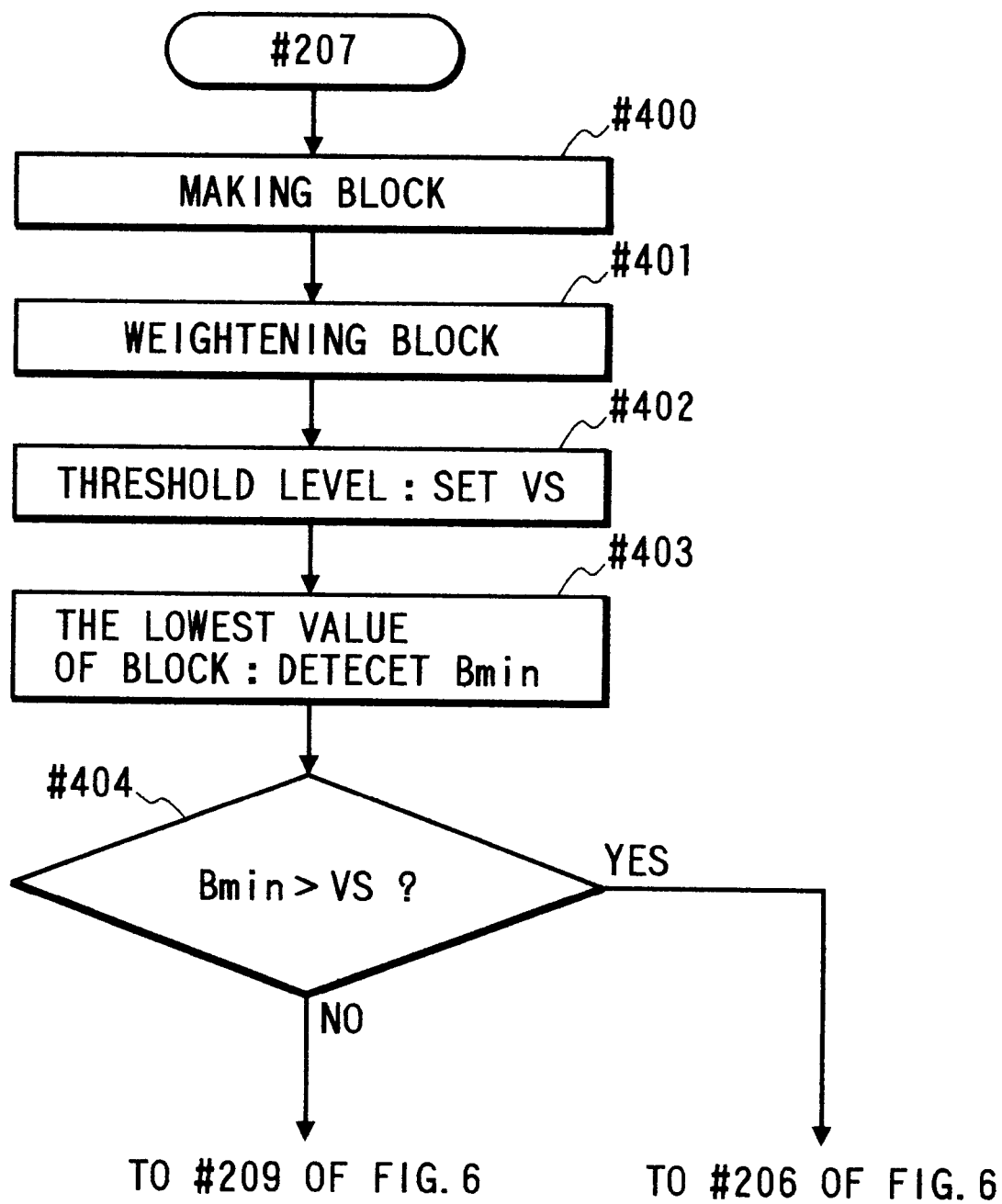
FIG. 10 is a flowchart of an operation in step #207 in FIG. 6.

FIG. 10 shows a flowchart of a wink determination operation. In this drawing, picture element signals corresponding to lengthwise and widthwise "60×80" picture elements obtained in the step #207 are converted to a lengthwise and widthwise "15×20" block signal having each block signal consisting of an average output signal of lengthwise and widthwise "4×4" picture elements (#400).

Figure 11A:
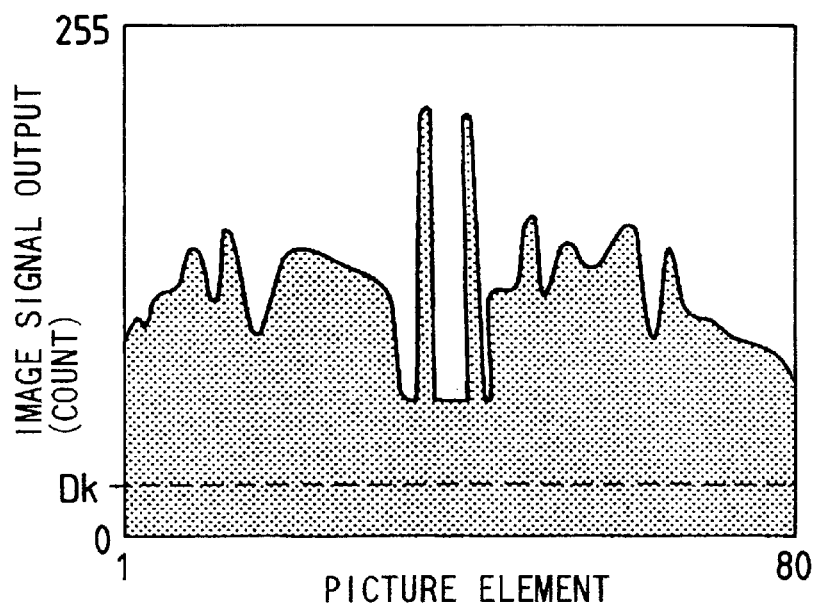
FIGS. 11A and 11B are diagrams for describing the operation in FIG. 10.
Figure 11B:
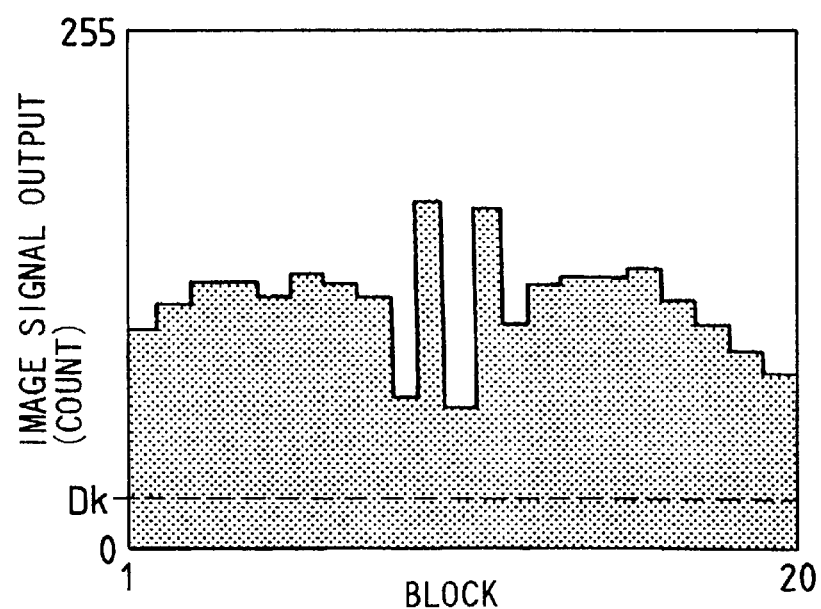

Referring to FIGS. 11A and 11B, there are shown effects of blocking picture element signals. FIG. 11A is a cross section of eyeball image horizontal direction luminance signals at a center of a pupil before blocking while a photographer performs a line of sight detection in an external light, in which signals in an eyelid around the eyeball are relatively higher due to an external light, a lot of spiked signals are generated being combined with black eyelashes, and in some cases, the signals become lower than signals in a pupil portion or the signals are not constant due to an effect of eyelashes also in the pupil portion.

On the other hand, FIG. 11B shows a graph of the signals in FIG. 11A converted to a block signal having the above "4×4" picture elements. It is understood that it is easy to specify a position of the pupil portion having a certain area due to smoothed signals in the eyelid and pupil portions. In this drawing, Dk indicates an output in a dark photographing element, that is, a dark value.

Subsequently, the longer a distance becomes from a neighborhood of the center assumed to be 0 becomes the greater the weighting value that is added to a block signal of the "15×20" picture elements block signal obtained in the above on the CCD-EYE picture element plate (step #401).

Figure 12A:
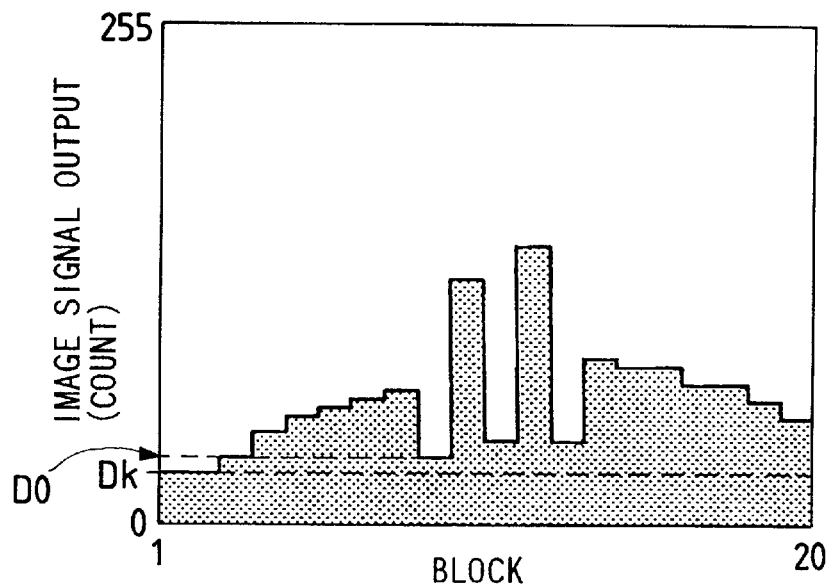
FIGS. 12A and 12B are diagrams for describing the operation in FIG. 10.

Referring to FIG. 12A, there is shown a graph of eyeball image block signals on a horizontal cross section of a Purkinje image when a photographer is performing a line of sight detection in a room (in an environment not affected by an external light), in which peripheral quantity of light is reduced on a CCD-EYE picture element plate and a leftmost block output is lowered to a dark value level due to uneven illumination of the IRED 13 for illuminating the neighborhood of the eyeball 15 and characteristics of an optical system for performing the line of sight detection. On the other hand, since a value of a block output D0 of the pupil portion is slightly higher than the dark value due to an illumination light, the lowest value of the entire block signals is not a signal of the pupil portion in this state.

Figure 12B:
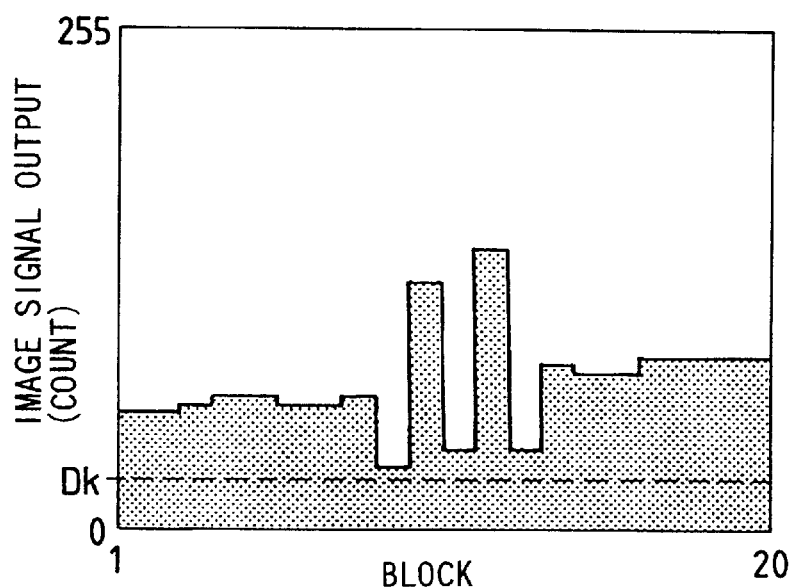

FIG. 12B is a graph of corrected signals in FIG. 12A using a method of adding each correction value to a signal value of a block belonging to a corresponding area which is one of three areas into which the above "15×20" picture element block is concentrically divided, for example, assuming that a correction value of an area around the center is 0 count, that of an area outside the center area is 10 count, and that of the outermost area is 30 count; in other words, a correction is made so that the lowest value of the block signal becomes a signal value corresponding to the pupil portion of the photographer by solving the reduction of the peripheral quantity of light apparently.

Next, a threshold value Vs is set as a determination standard for the wink determination (step #402).

Figure 13A:
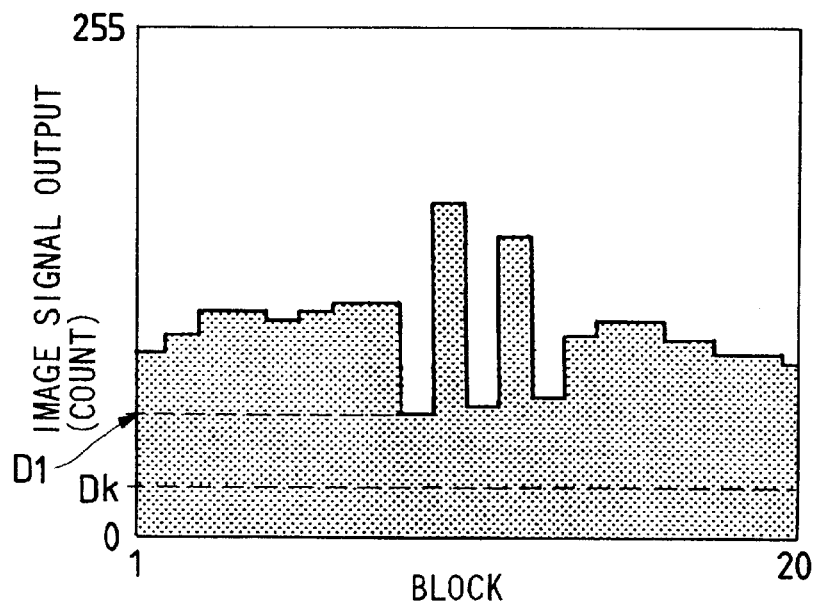
FIGS. 13A and 13B are diagrams for describing the operation in FIG. 10.
Figure 13B:
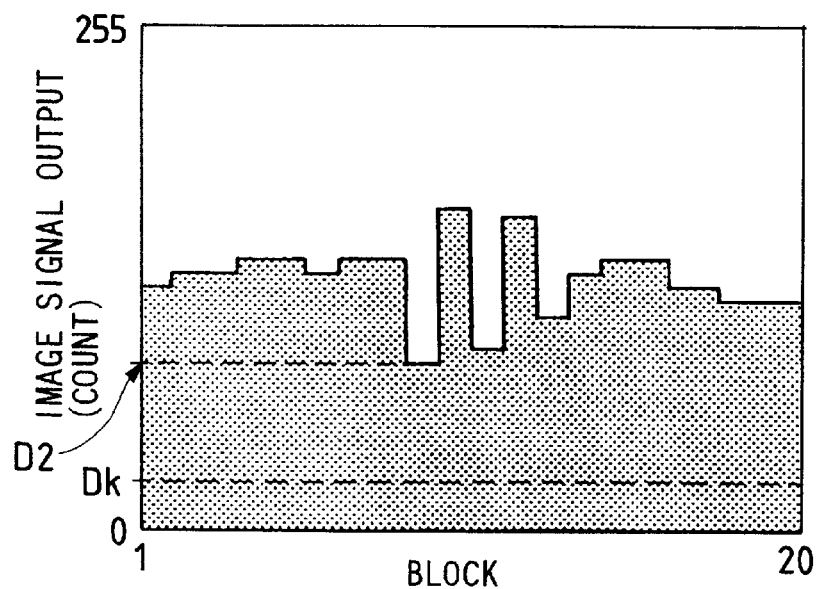

Referring to FIGS. 13A and 13B, there are shown eyeball image block signal diagrams on a Purkinje image horizontal cross section when a photographer with naked eyes or wearing glasses is performing a line of sight detection outdoors (in an environment affected by an external light). As shown in these drawings, output values D1 and D2 of the pupil portion are higher than the output D0 of the pupil portion of the indoor signals in the above FIG. 12A, therefore an external light leaks out to the pupil portion.

In addition, it is understood that the photographer wearing glasses is easily affected by an external light and an output value of the pupil portion is greater than that for the photographer with naked eyes since a distance between a camera body and an eyeball of the photographer wearing glasses is longer than a distance between the camera body and an eyeball of the photographer with naked eyes.

Accordingly, considering the above, a threshold value Vs is determined based on the table in FIG. 14 according to a photometric value indicating a brightness of an outside world and a use of an illumination for naked eyes or glasses for the accumulation control of the CCD-EYE 14.

In FIG. 14, a 38 count is determined as a threshold value Vs based on the table in FIG. 14, for example, assuming that a brightness of an outside world is measured as BV7 by the photometric sensor 10 and that an illumination for naked eyes is selected for a photographer by calibration.

After a completion of setting the threshold value Vs, a value Bmin of a block whose luminance signal is the lowest in the above "15×20" picture element blocks is found out (step #403) to compare the Bmin value which is a wink determination with the above Vs (step #404). If the photographer has winked, the pupil of the photographer is deleted from the eyeball image signals and naturally the lowest block luminance signal obtained in the above is a signal of a part other than the pupil, for example, the eyelid and it is higher than the threshold value Vs (Bmin>Vs), therefore, the camera determines that the photographer has winked and performs reaccumulation of the CCD-EYE 14 in the step #206.

If the photographer has not winked, the lowest block luminance signal is a signal of the pupil portion and its value is lower than the threshold value Vs (Bmin≦Vs); therefore, the camera determines that the photographer has not winked and performs a line of sight detection processing in the step #209.

Although an explanation is made in the above for a control method to improve the success rate of a line of sight detection by determining whether or not the photographer has winked, the means for detecting and determining a wink of this invention are also effective for use as input means to a camera, such as a release by a wink of a photographer.

Fourth Embodiment

The fourth embodiment of this invention is described below.

In an explanation of a flowchart of the wink determination in FIG. 6 according to the third embodiment, the table in FIG. 14 is used for obtaining Vs in setting the threshold value Vs to determine whether or not the photographer has winked. On the other hand, in the fourth embodiment, a threshold value is calculated as a function of a brightness of an environment in which a photographer exists and a distance between an eyeball of the photographer and a camera by using the following expression to perform a precise wink determination:

$$Vs = Dk + 10 \times (Ds/15)^{1/3} \times (BV-4)^{1/2} \text{ (when } BV \geq 5)$$

$$Vs = Dk + 10 \times (Ds/15)^{1/3} \text{ (when } BV < 5)$$

where Dk indicates an output count value in a dark state (when a shutter curtain is closed) of a photographing element, Ds indicates a distance between a photographer and a camera (mm), and BV indicates a luminance value of a field obtained by the photometric sensor. Naturally, the distance Ds cannot be calculated from an eyeball image signal obtained when the photographer winks; therefore, the last time value is used. In addition, a brightness of the neighborhood of an eyeball of the photographer can be directly obtained based on an output of the photographing element without calculating the object luminance BV with the photometric sensor.

In the above embodiments, it can be precisely detected that the user has winked when he or she performs a line of sight input to an optical device such as a camera by setting means for determining whether or not the user contacting his or her eye with a viewfinder has winked during a line of sight detection and performing the wink determination based on a comparison between a threshold value and a lowest value in a plurality of block signal outputs obtained by averaging a plurality of picture element signals in eyeball image signals of the user by using the wink determination means.

This invention is described in detail below based on the embodiments shown in the drawings.

Figure 15:
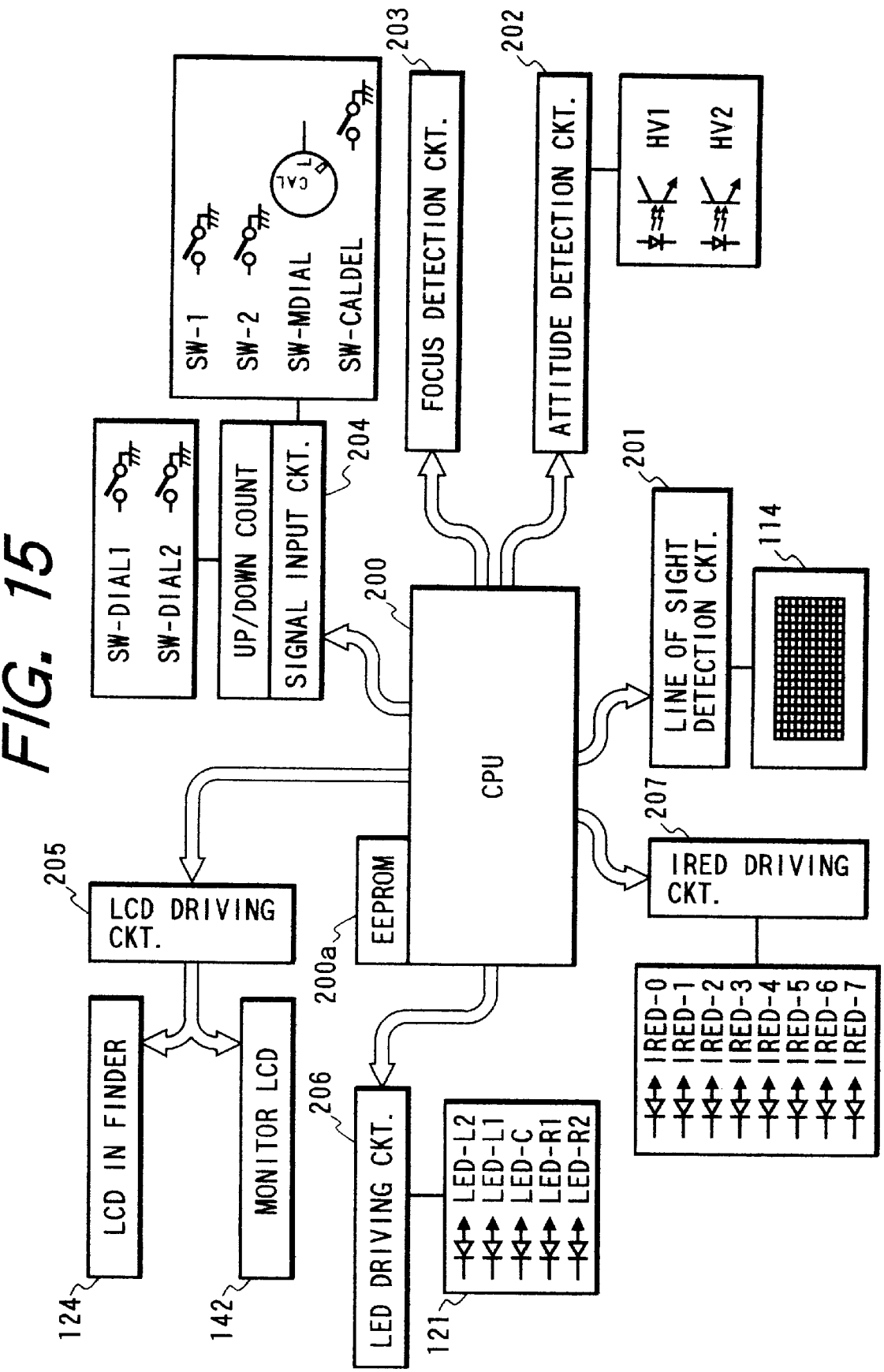
FIG. 15 is a block diagram of a main part configuration of the camera according to a fifth embodiment.

Referring to FIG. 15, there is shown a block diagram illustrating a main part of an electric circuit built into a camera body according to the fifth embodiment.

A central processing unit (hereinafter, CPU) 200 of a microcomputer which is a camera control means built in the camera body is connected to a line of sight detection circuit 201, an attitude detection circuit 202, an auto focus detection circuit 203, a signal input circuit 204, an LCD driving circuit 205, an LED driving circuit 206, and an IRED driving circuit 207. In addition, it transmits or receives signals to or from a focus adjusting circuit arranged in a photo taking lens and an aperture driving circuit via a mount contact which are not shown.

An EEPROM 200*a* which is a storing means attached to the CPU 200 stores photographic information such as a film counter or others and personal difference correction data obtained by calibration.

The line of sight detection circuit 201 transmits an output of an eyeball image from an image sensor 114 (CCD-EYE) to the CPU 200. The CPU 200 converts the eyeball image signal from the image sensor 114 in an A/D conversion by using an A/D conversion means in the CPU and extracts characters of the eyeball image required for the line of sight detection based on a predetermined algorithm based on this image information and calculates a photographer's rotation angle from positions of the characteristics.

The attitude detection circuit 202 comprises a plurality of pairs of photosensors, LEDs (HV1, HV2), and a cover movable with a gravity and detects an attitude by a change of an output from the photo sensor due to a movement of the cover by gravity.

The auto focus detection circuit 203 transmits a voltage obtained from a plurality of line sensors to the CPU 200, which converts line sensor signals in an A/D conversion sequentially by a built-in A/D conversion means. The sensor signals converted in the A/D conversion are used for calculating a focus state following a predetermined algorithm.

Figure 16B:
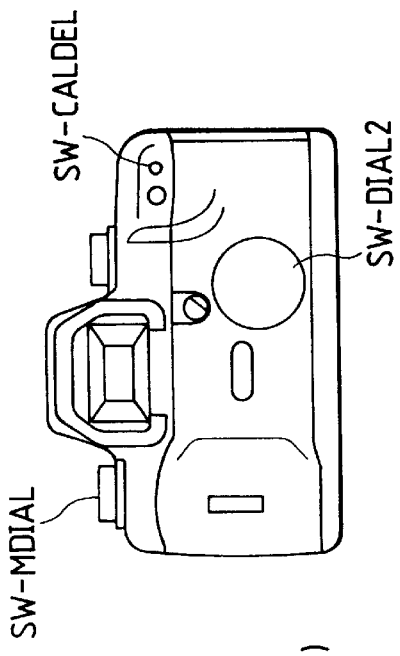
FIGS. 16A to 16D are diagrams illustrating respective operation members, illuminating means for line of sight detection, and a sample display in a viewfinder of the camera in FIG. 15.
Figure 16A:
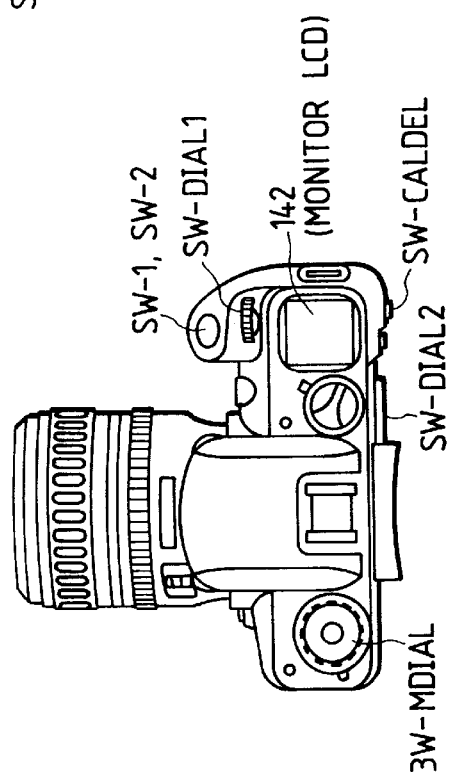

The signal input circuit 204 enters the signals from various switches, and generates an interruption signal in the CPU 200 if a state of a switch changes. Switch SW-1 is set "on" by a first stroke of a release button to start photometry, AF, and a line of sight detecting operation and switch SW-2 is a release switch which is set "on" by a second stroke of the release button, and SW-MDIAL is a modes dial for selecting a calibration mode and a camera lock position as well as various photographing modes of the camera (See FIGS. 16A and 16B). SW-CALDEL is a personal difference correction data deletion switch. A state of a SW-DIAL1 or SW-DIAL2 electronic dial is entered into an up/down counter of the signal input circuit 204 and a rotation click amount of the electronic dial is counted. The electronic dial SW-DIAL1 is arranged between the SW-1/SW-2 and an LCD for monitoring 142, so that it can be operated with a forefinger of a right hand (See FIG. 16A). The electronic dial SW-DIAL2 is arranged on a back of the camera, so that it can be operated with a thumb of a right hand (See FIG. 16A).

The LCD driving circuit 205 displays various information on an LCD in a viewfinder 124 (See FIG. 16D) and the LCD for monitoring 142 (See FIG. 16A) and drives a buzzer which is not shown, to sound the buzzer.

The LED driving circuit 206 is used to turn on an LED 121 (LED-L2, LED-L1, LED-C, LED-R1, and LED-R2) for illuminating a focus detection area in a viewfinder (focus detection point) with superimposing. The LED-L2, LED-L1, LED-C, LED-R1, and LED-R2 correspond to focus detection marks in the viewfinder, FP-L2, FP-L1, FP-C, FP-R1, and FP-R2, respectively, and a focus detection mark in the viewfinder is illuminated by turning on the LED 121 (See FIG. 16D).

The IRED driving circuit 207 is used to turn on infrared emitting diodes (IRED-0, IRED-1, IRED-2, IRED-3, IRED-4, IRED-5, IRED-6, and IRED-7) for illuminating an eyeball of a photographer with an infrared emitting light. This circuit contains a circuit for preventing an overcurrent and a circuit for preventing conduction for a long time. The IRED is used in a unit of a pair of two IREDs and they illuminate an eyeball from a lower side. Illumination for naked eyes is near an optical axis for a line of sight detection and an interval between two IREDs is relatively narrow. Illumination for glasses is remote from the optical axis and an interval between two IREDs is relatively wide. In addition, a photographer wearing glasses often has a longer eyeball distance than a photographer with naked eyes. Therefore, if an interval between IREDs is narrow, a cornea reflection image cannot be detected, or if an eyeball is illuminated from a position near the optical axis, a cornea reflection image cannot be detected due to a reflection image (ghost) on a surface of the glasses. In addition, for an illumination for glasses, a light amount is increased or a sensor accumulation time is extended in comparison with an illumination for naked eyes.

If a camera is held in a horizontal orientation, a pair of IRED-0 and IRED-1 and a pair of IRED-4 and IRED-5 are used for naked eyes and for glasses, respectively. If the camera is held in a vertical orientation on a grip, a pair of IRED-3 and IRED-0 and a pair of IRED-7 and IRED-4 are used for naked eyes and for glasses, respectively. If the camera is held in a vertical orientation under a grip, a pair of IRED-1 and IRED-2 and a pair of IRED-5 and IRED-6 are used for naked eyes and for glasses, respectively (See FIG. 16C).

As described above, an IRED pair with a narrow interval is used for a photographer with naked eyes in any attitude of the camera and an IRED pair with a wide interval is used for a photographer wearing glasses or in a case of a long eyeball distance.

The CPU 200 transmits signals to respective function members of the line of sight detection device for controlling and receives signals from various detection circuits to execute their signal processing.

Figures 17, 17A:
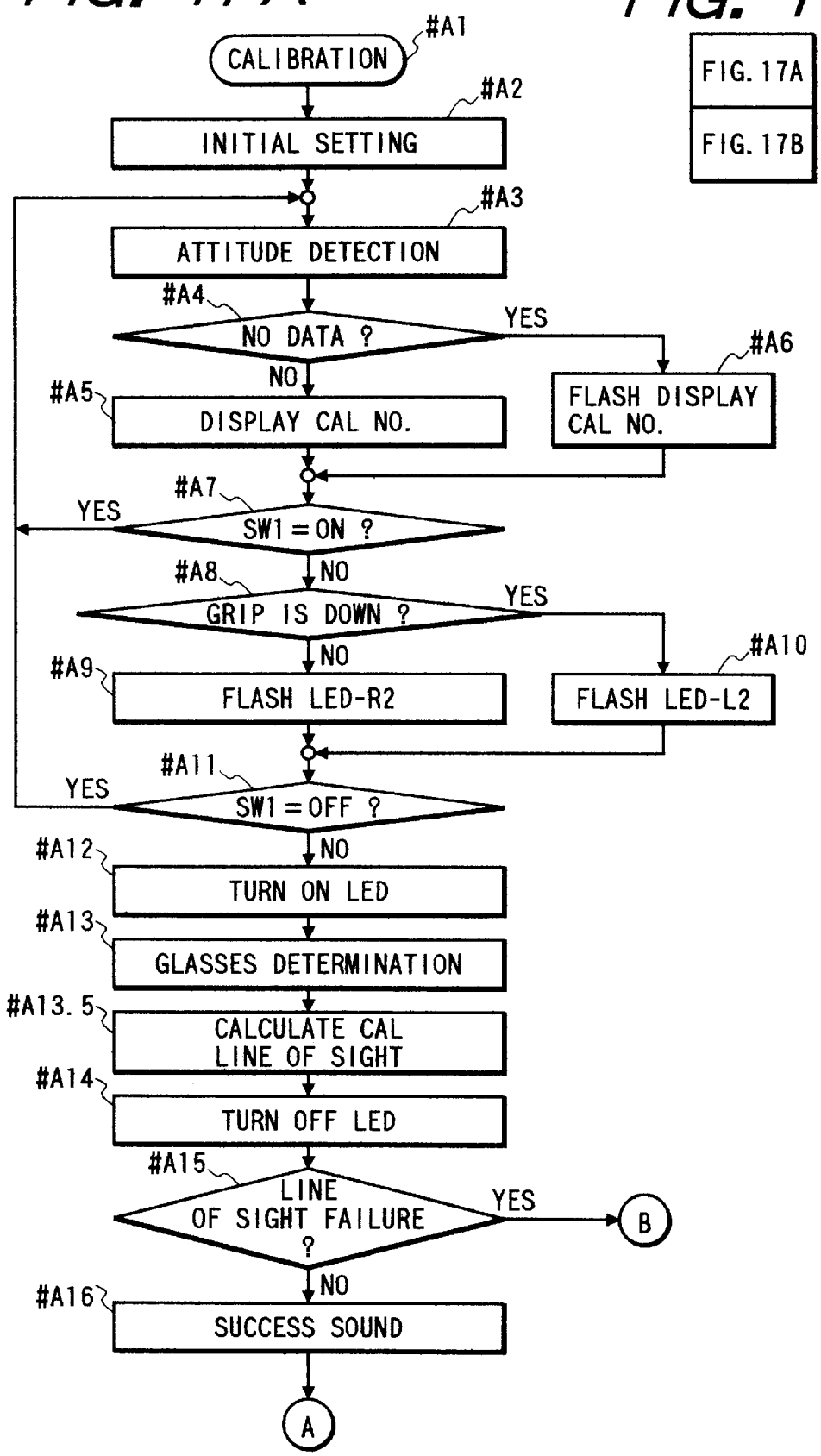
FIG. 17 is comprised of FIGS. 17A and 17B showing flowcharts of a calibration operation of the camera in FIG. 15.
Figure 17B:
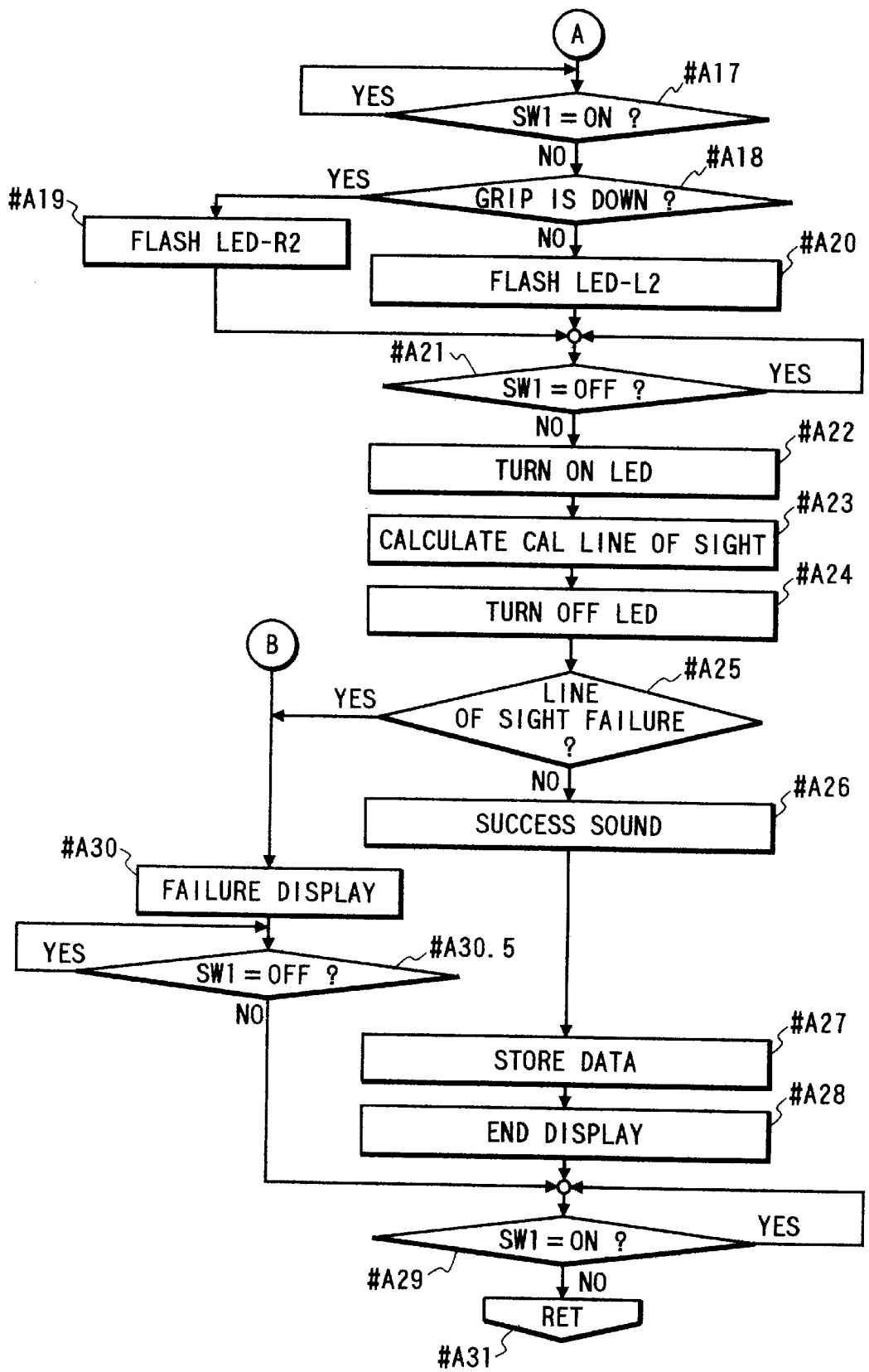

Next, a calibration operation and its display are described by using FIGS. 17A and 17B.

If the mode dial SW-MDIAL of the camera is set to a calibration mode, the control of the program goes to step #A1. By rotating the electronic dial SW-DIAL1 in the calibration mode, a calibration number can be changed. If there is some change in the electronic dial SW-DIAL1 in the calibration mode, a change processing is performed for a calibration number by an interruption.

Next, a parameter is initialized (#A2). After completion of the initialization, an attitude of the camera is detected by classifying the camera attitudes into four states (a horizontal orientation, a vertical orientation: with a grip in the upper side, a vertical orientation: with a grip in the lower side, upside-down)(#A3). Subsequently, it is determined whether or not there is calibration data for the attitude (#A4). If there is data, a calibration number (CAL number) is turned on (#A5). Otherwise, the CAL number is flashed (#A6).

Figure 16D:
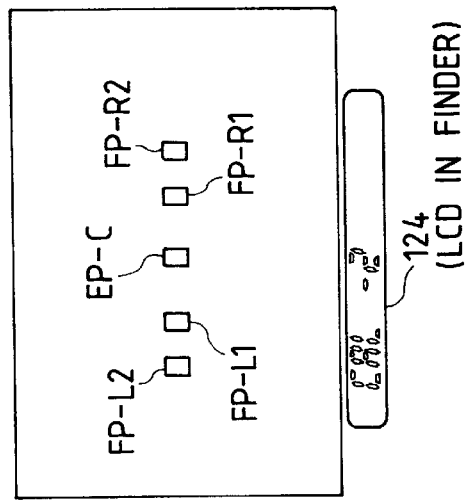
Figure 16C:
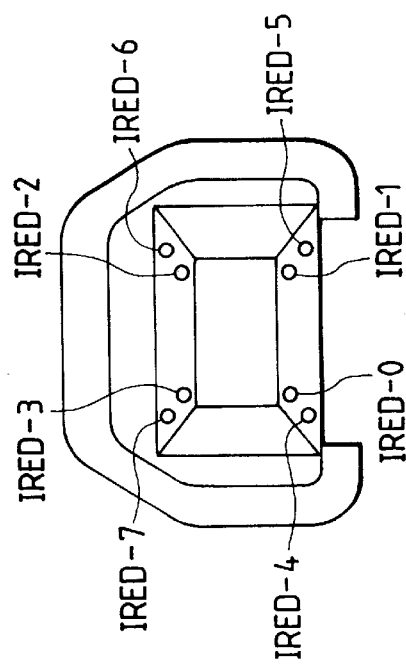

Then, a switch SW-1 state is determined (#A7). If the switch SW-1 is kept to be on, operations in steps #A3 to #A7 are repeated. If the switch SW-1 is in an off state, a calibration index is displayed in the viewfinder with superimposing. If the camera is held in a horizontal orientation, a right focus detection area is used as a first index, and if it is held in a vertical orientation, a focus detection area which is always put in an upper side is used as the first index. For this purpose, it is determined whether or not the attitude of the camera is in the vertical orientation with the grip in the lower side (#A8). If it is so, a leftmost focus detection mark FP-L2 in FIG. 16D is displayed by flashing the LED-L2 (#A10). If the camera is in other attitudes, a rightmost focus detection mark FP-R2 is displayed by flashing the LED-R2. In this state, it is awaited that the switch SW-1 is set on (#A11).

While the above switch SW-1 is off, operations in steps #A3 to #A11 are repeated. If the electronic dial SW-DIAL1 is rotated during these operations, a display of a calibration number changes.

If the switch SW-1 is set "on", the LED flashed in the above step #A9 or #A10 is turned on (#A12) and a subroutine "glasses determination" is called to select an illumination used for the line of sight detection or to set other parameters (#A13). A line of sight detection is performed with some types of illumination with selecting which illumination system should be used or setting brightness of the illumination based on the result. The details are described by using flowcharts in FIGS. 18A and 18B.

Next, to obtain calibration data, the "CAL line of sight calculation" routine is called (#A13.5). In this embodiment, a line of sight detection is performed with the illumination determined by the subroutine "glasses determination" and parameter setting. After a completion of the line of sight calculation, the LED is turned off (#A14) to determine whether or not the line of sight calculation is unsuccessful (#A15). If it is successful, the buzzer sounds to inform a photographer of its success by giving a peep (#A16).

Then, it is awaited that the switch SW-1 is set "off" (#A17), and when it is set "off", a second index is flashed. If the camera is held in a vertical orientation with the grip in the lower side, another LED is to be flashed, whereby, it is determined (#A18). If the camera is held in a vertical orientation with the grip in the lower side, the LED-R2 is flashed to display a focus detection mark FP-R2 (#A19). Otherwise, the LED-L2 is flashed to display a focus detection mark FP-L2 (#A20). By this operation, a lower focus detection area is flashed if the camera is held in a vertical direction, and a left focus detection area is flashed if the camera is held in a horizontal direction.

Then, it is awaited that the switch SW-1 is set "on" again (#A21), and if it is set "on", the flashing LED is switched to be turned on (#A22) to perform a line of sight detection of a calibration for an index of a second point (#A23). At this time, a flag CALSTEP2 indicating a line of sight calculation for the second point index is set. After a completion of the line of sight calculation, the LED is turned off (#A24) and it is determined whether or not the line of sight detection is unsuccessful again (#A25). If it is successful, the buzzer sounds to inform the photographer of its success by giving a peep (#A26), and obtained data is stored in the EEPROM 100a in the CPU with being associated with a camera attitude and a CAL number (#A27). Then, a completion of the calibration is displayed (#A28) and it is awaited that the switch SW-1 is set "off" (#A29). If the switch SW-1 is set "off", the control returns.

Next, an explanation is made below for an unsuccessful line of sight calculation in the step #A13.5 or the step #A23.

In this case, the control branches from the step #A15 or #A25 to a step #A30 to indicate an unsuccessful detection. The indication notifies the photographer of a failure by flashing both of the CAL display and the number and sounding the buzzer continuously with peeps. It is awaited that the switch SW-1 is set "on" (#A30.5) and set "off" (#A29), and then the control returns (#A31).

If the mode dial SW-MDIAL of the camera is continuously set in the calibration mode after the control returns, the program is executed from the above step #1.

A deletion of personal difference correction data is simply described below.

By setting a calibration data deletion switch SW-CALDEL "on" when the camera is set in the calibration mode, personal difference correction data can be deleted for each camera attitude. If the deletion switch SW-CALDEL is set "on", the signal input circuit 204 generates an interruption signal into the CPU 200 and the CPU 200 executes an interruption subroutine "data deletion".

Next, an explanation is made below for the subroutine "glasses determination" (in step #A13 in FIG. 17A) which is a main section of this invention by using flowcharts in FIGS. 18A and 18B.

First, a glasses flag (GlassF) is set to 0 for setting for naked eyes and an area restriction inhibition flag (EstimDis) is set to 1 to determine whether or not there is a ghost generated by glasses (#A32). Since a ghost cannot be detected if the ghost exists outside the restricted area, a line of sight calculation is performed in an entire area. After that, a line of sight detection (NAC_MAIN) is called (#A33).

Next, a subroutine "line of sight detection" is described below by using FIG. 19A.

If the subroutine is called (#M01), personal difference data corresponding to the set CAL number is read out from the EEPROM 200a (#M02). For the calibration mode, data entered in the past is read out. If there is no data in the past or data is deleted, however, parameters are initialized to predetermined values. Then, common parameters are initialized independently of the CAL number (#M03). After a completion of the initialization of the parameters, an image sensor accumulation is started (#M04).

The image sensor 114 first performs a preliminary accumulation for a predetermined time without using illumination means. An accumulation control method for actually obtaining an eyeball image is determined based on a result of the preliminary accumulation. After the accumulation control method is determined, an illumination is turned on and the accumulation is started. For the illumination, an illumination for glasses is used if the flag GlassF is set to 1. As for the illumination, the illumination for glasses is used if the flag GlassF is set to 1, and an illumination for naked eyes is used if it is set to 0.

An accumulation control is changed by linking with the illumination. Specifically, an accumulation time for the illumination for glasses is longer than that for the illumination for naked eyes. Alternatively, an optical amount of the illumination for the glasses can be increased in comparison with that of the illumination for naked eyes.

In addition, if a correction of an accumulation control is set apart from a type of the illumination, an accumulation control is corrected (for example, an accumulation time is reduced or an external light deleted accumulation is performed).

Next, data is read from the sensor and characters are extracted (#M05). After extracting coordinates of characters such as a center of a pupil or a reflection image of an illumination (P image: Purkinje image), a rotation angle of an eyeball image is obtained by a predetermined calculation (#M06). In a normal mode, coordinates of a gazing point of a user are obtained by using personal difference correction data obtained in the calibration from a rotation angle of the eyeball image. During a calibration operation, only the rotation angle of the eyeball is obtained. At the calibration, a calibration flag is set to 1 to perform a line of sight calculation for the calibration. In addition, other data is obtained such as a value indicating a degree of reliability of the eyeball image and an eyeball distance.

As described in the above, a rotation angle of a user's eyeball, a distance to the eyeball, and a reliability evaluation value of the calculated data are obtained by extracting characters such as a pupil circle of an eyeball image and a reflection image (P image) of illumination and performing a predetermined calculation in the "line of sight detection" (NAC_MAIN).

Returning to FIGS. 18A and 18B, a result of the line of sight detection is determined and then the control branches (#A34). If the line of sight detection is successful, the NAC_OK flag is set to 1; therefore, it is used for the determination.

Operations are described below for some cases.

First, an operation for naked eyes (when a ghost is not generated by glasses) is described below.

If a line of sight detection is successful, processing proceeds to step #A35 to determine whether or not the current detection is a second round detection (twice detection of illumination for naked eyes→illumination for glasses is counted as a single round). If it is in a first round, detection the control branches to step #A36. Then, it is determined whether or not a ghost has been already detected. If it is the first time detection, then control branches to step #A37 since the ghost determination has not been performed yet. Since the line of sight detection is performed by fetching an eyeball image for the ghost determination, an area restriction inhibition flag (EstimDis) is cleared to 0 before the ghost determination. Since the area restriction is inhibited for a ghost determination, the area restriction should be inhibited only once, and therefore, the area restriction is performed from the next time.

Next, the number of the ghosts is determined (#A38). For the number of the ghosts, is previously counted areas larger than a P image having the same luminance level as for the P image at a P image detection. Since no ghost is generated for a photographer with naked eyes, a threshold value of an eyeball distance Sze is set to a threshold value for no ghost (#A40). And then, the set threshold value is compared with a detected eyeball distance Sze (#A43). If the eyeball distance is relatively narrow, the control branches to step #A44 to determine whether or not the illumination is that for glasses (an eyeball distance of a photographer with naked eyes is relatively shorter in comparison with a photographer wearing glasses). First, processing proceeds to step #A50 because of setting for naked eyes, and it further proceeds to step #A52 because of setting for naked eyes also in this step.

Next, the area restriction inhibition flag (EstimDis) is set to 0 to permit an area restriction. The area restriction inhibition flag has been already set to 0 in the operation described above, so that the area restriction inhibition flag is kept to be set to 1 if the control passes through another route. At the same time, the CAL glasses determined flag (CAL_JAGJ) indicating a state immediately after a glasses determination is set to 1 (#A52). If this flag is set to 1, data used for the glasses determination is used for the CAL line of sight calculation. Finally, the subroutine is returned (#A53).

As described above, it is possible to determine whether or not there is a ghost and to reduce a calculation time after the ghost determination by inhibiting an area restriction of an image first, performing a ghost determination on an entire image, permitting the area restriction after obtaining an image for a ghost determination, and reading only a pupil area in a sensor screen to reduce the calculation time for a line of sight detection. By reducing a time for a single line of sight detection, a line of sight detection can be performed many times during the same time and precious calibration data can be obtained. In addition, a ghost determination can be performed correctly, therefore, an illumination for glasses can be set correctly for cases in which the illumination for glasses must be used essentially.

Next, a description is made below for a case in which the eyeball distance is greater than the threshold value in step #A43 in FIG. 18B.

In this case, the control branches from the step #A43 to step #A46. Then, the glasses flag (GlassF) is determined, and a subroutine "glasses setting & distance determination" (GsetDstChk) is executed since the flag is set to 0 (#A47). In a subroutine "glasses setting & distance determination" (GsetDstChk), the glasses flag (GlassF) is set to 1 and an eyeball distance is determined again. In this method, an accumulation tends to be too much if the distance is narrow with an illumination for glasses, therefore, a countermeasure against the problem is newly added in this invention. In this embodiment, the distance is determined by using a threshold value different from that in the step #A43. If the eyeball distance is relatively narrow, a short distance flag (DistanceF) is set to 1.

After a completion of the glasses setting & distance determination (GsetDstChk) routine, the control returns to the step #A33 to perform the "line of sight detection" (NAC_MAIN) again. Then, if the line of sight detection is successful (#A34) and it is in a first round detection (#A35), a ghost flag is determined (#A36). If there is no ghost, EstimDis is cleared to 0 (#A37) and the number of the ghosts is determined (#A38). After that, a threshold value of the eyeball distance Sze is set to a value of no ghost (#A40) and a detected eyeball distance is compared with the threshold value (#A43). If the eyeball distance is long, the glasses flag is checked in step #A46. Since the illumination for glasses is used at this time, processing proceeds to step #A50 and the "glasses setting & distance determination" subroutine, GsetDstChk is executed again to determine the distance based on a result detected in the illumination for glasses (#A51). It is because the distance can be determined more precisely by performing a determination based on the result of a line of sight calculation in the illumination for glasses though the distance has been already determined in the illumination for naked eyes in some cases.

Next, the area restriction inhibition flag (EstimDis) is set to 0 to permit area restrictions and the CAL glasses determined flag (CAL_JAGJ) is set to 1 (#A52) to terminate the subroutine (#A53).

Description is made below for a line of sight detection for a photographer wearing glasses (when a ghost is generated by glasses).

A line of sight detection is performed in step #A33, and if the line of sight detection is successful, processing proceeds from step #A34 to step #A35 to determine whether or not the current detection is in a second round detection. If it is a first round, the control branches to step #A36. Since a ghost determination has not been performed yet at the first time detection, the control branches to step #A37. The "area restriction inhibition flag" (EstimDis) is cleared to 0 before ghost determination to permit area restrictions from the next time. Then, the number of the ghosts is determined (#A38). If the number of ghosts is greater than a threshold value, the control branches to step #A39 to determine whether or not an illumination for glasses is used. Processing proceeds to step #A48 due to setting for naked eyes at the first time and the ghost flag is set to 1.

Next, the glasses flag (GlassF) is set to 1 in the "glasses setting & distance determination" (GsetDstChk) subroutine (#A49) to determine an eyeball distance. After a completion of this subroutine, the control returns to the step #A33 to perform the "line of sight detection" (NAC_MAIN) again. If the line of sight detection is successful (#A34), it is determined whether or not the detection is a second round detection (#A35). Since it is a first round, detection processing proceeds to step #A36. A ghost determination has been already performed and the ghost flag is set to 1, therefore, a threshold value of the eyeball distance Sze is set to a "threshold value with a ghost" (#A42).

The above threshold value is compared with the eyeball distance Sze for branching (#A43). If the distance is long, a determination for glasses is performed in step #A46. Since an illumination for glasses is used, processing proceeds to step #A50 and the control branches to step #A51. The "glasses setting & distance determination" subroutine, GsetDstChk is executed again (#A51). Then, the distance is determined based on a result detected in the illumination for glasses. Next, the area restriction inhibition flag (EstimDis) is set to 0 to permit area restrictions and the CAL glasses determined flag (CAL_JAGJ) is set to 1 (#A52) to terminate the subroutine (#A53).

If the distance is short as a result of a distance determination in the above step #A43, the control branches to step #A45 via a step #A44. Since a ghost is generated in the first time line of sight detection, a redetection is performed in the illumination for glasses, and it is a case for a short eyeball distance. In this case, the glasses flag (GlassF) and the short distance flag (DistanceF) are cleared to 0 and the line of sight detection is attempted in the illumination for naked eyes again. The second-round flag is set to 1 to set the second-round state. After that, the control returns to the step #A33 to perform the "line of sight detection" (NAC_MAIN) again. If the line of sight detection is successful (#A34), the control branches to perform the second-round determination (#A35). Since it is in the second-round, processing proceeds to step #A50 to perform a determination for glasses. As a result, processing proceeds to step #A52. Then, the area restriction inhibition flag (EstimDis) is set to 0 to permit area restrictions and the CAL glasses determined flag (CAL_JAGJ) is set to 1 (#A52) to terminate the subroutine (#A53).

As described above, the distance is determined for the illumination for glasses. If the eyeball distance of a photographer is shorter than a predetermined value, an appropriate eyeball image is obtained by changing an accumulation control. More specifically, the control is made by extending an accumulation time of a receptor sensor or by intensifying an illumination for the illumination for glasses, while an accumulation time is reduced or an illumination is weakened if the eyeball distance is short in the illumination for glasses.

Next, an explanation is made below for an unsuccessful line of sight detection.

If a line of sight detection is unsuccessful as a result of the "line of sight detection" (NAC_MAIN), the control branches from the step #A34 to step #A54. Then, it is determined whether or not the wink flag (WinkF) is set to 1 (#A54). If Wink is set to 1, a repetition flag (RepFlag) is set to 1 (#A55). Since RepFlag is not cleared during a calibration operation, the same accumulation control is performed in the wink determination only once. It is to prevent the calibration operation from taking too much time due to winks. In addition, a wink determination is performed only in the glasses determination.

Next, the control returns to the step #A33 to perform the "line of sight detection" (NAC_MAIN) in the same illumination again.

A wink detection is performed in the "character extraction" in a line of sight calculation, that is, in step #M05 in FIG. 19A. The "character extraction" is described below by using a flow chart shown in FIG. 19B.

If the "character extraction" subroutine is called (#R01), a block reading is performed in a sensor (#R02). By this block reading, the entire contents of the sensor can be roughly read. The lowest luminance is obtained by using an image achieved by the block reading (#R03). The lowest luminance is used to detect a readout area in area restrictions and to extract characters as well as to detect a wink. After that, a wink detection (#R04) and an area setting (#R05) are performed. Then, image characters are extracted while an area set in the area setting is read out (#R06). After a completion of extracting the characters and reading the contents of the sensor, the subroutine is returned (#R07).

Figure 20:
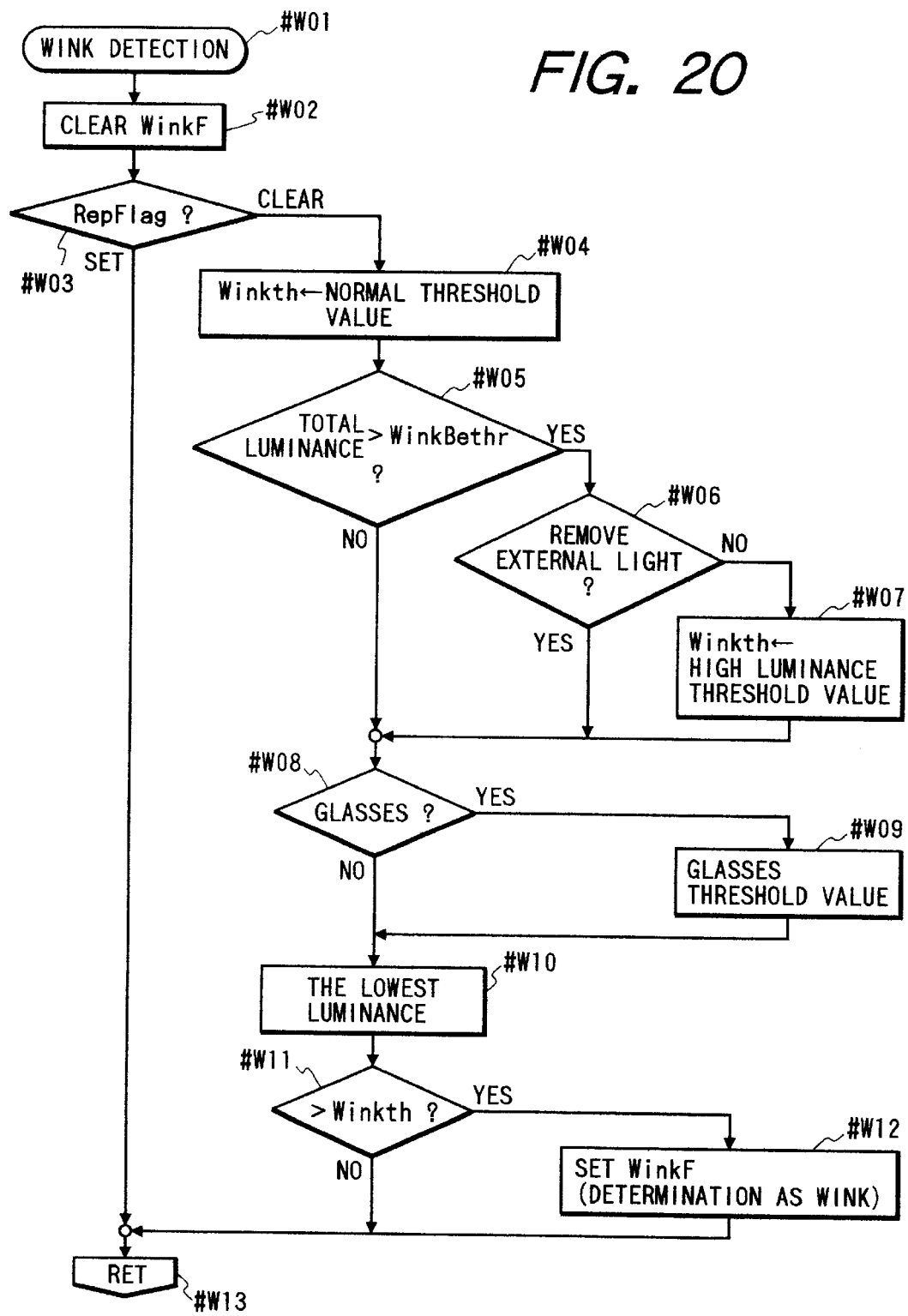
FIG. 20 is a flowchart of an operation in step #R04 in FIG. 19B.

Subsequently, the wink determination is described below by using FIG. 20.

If the "wink detection" subroutine is called (#W01), the wink flag, WinkF is cleared (#W02), first. Then, it is determined whether or not the same accumulation control is performed in the last wink detection by using the RepFlag (#W03). If the RepFlag is set, the control immediately returns. It is to prevent the wink determination from being performed twice continuously.

If the RepFlag is cleared, a normal threshold value for a wink is set (#W04). Next, an entire luminance is determined to be an entire luminance threshold value. If the entire luminance is high (#W05) and an external light removal control is not used (#W06), a high luminance threshold value for a wink is set. Next, it is determined whether or not the illumination for glasses is applied (#W08). If it is a glasses threshold value is set (#W09). Then, a dark amount of the sensor is subtracted from the lowest luminance obtained from the block image (#W10) and the result is compared with the set threshold value (#W11). If it is greater than the threshold value, the WinkF is set to 1 to determine that a wink is detected. After a completion of the wink determination, the control returns (#W13).

Returning to FIGS. 18A and 18B, an explanation is made below.

If it is determined that a photographer has not winked in step #A54, the glasses illumination determination is performed (#A56). If the detection is unsuccessful in the illumination for naked eyes, a line of sight detection is performed in the illumination for glasses at the next time, therefore, the glasses flag (GlassF) is set to 1 (#A57). After that, the control returns to the step #A33 to perform the "line of sight detection" (NAC_MAIN). A line of sight calculation is performed in the illumination for glasses (#A33). If the line of sight detection is successful (#A34), it is determined whether or not the detection is a second round detection (#A35). If it is in a first round, detection a ghost determination is performed (#A36). If the first time line of sight detection is unsuccessful, the area restriction inhibition flag is cleared to 0 (#A37) and then the number of ghosts is determined (#A38) since a ghost determination has not been performed yet. If it is determined that there is a ghost, a glasses determination is performed (#A39) and the eyeball distance Sze is set to a threshold value with a ghost (#A41). If a ghost is not detected in step #A38, the Sze is set to a threshold value without a ghost (#A40).

After that, a distance determination is performed in the same manner as for the above to determine an appropriate illumination.

If the detection is unsuccessful in the illumination for naked eyes, the detection is attempted after switching the illumination to that for glasses independently of the eyeball distance. If the "wink detection" result is not used, the illumination for glasses may be set due to a wink accidentally made by a user with naked eyes or a calibration cannot be performed due to a wink of a user wearing glasses. Accordingly, the "wink detection" result is applied during a calibration operation and a line of sight calculation is repeated again in the same illumination, so that an illumination or an accumulation control can be set correctly. In addition, the repetition of the same accumulation control in the wink determination is limited to once to prevent a calibration operation from taking too much time due to the wink determination.

If the illumination for glasses is already determined in step #A56, a second-round determination is performed (#A58). If the detection is in a first round, an external light determination is performed (#A59). In this step, it is determined whether or not an external light is included. If it is so, the "area restriction inhibition flag" (EstimDis) is cleared to 0 to permit area restrictions at the next time (#A60). It is because an external light may generate a fake P image or a fake edge of eyelashes and it leads to an unsuccessful line of sight detection. Although the number of the ghosts cannot be determined if area restrictions are permitted in some cases, it is better than an unsuccessful line of sight detection. If an external light is not included, area restrictions are inhibited continuously. Next, the second-round flag is set to 1 and the glasses flag (GlassF) is cleared to 0 (#A61) to perform the "line of sight detection" (NAC_MAIN) in the illumination for naked eyes again.

If the control branches to step #A62 in the second round, the CAL failure flag which indicates a calibration failure is set to 1 (#A33). After that, the control passes through steps #A50 to #A52 (it passes through these steps for convenience of the program, and it does not have specific meanings) and then returns (#A53).

As described above, a line of sight calculation is performed in an order of an illumination for naked eyes→an illumination for glasses→an illumination for naked eyes→an illumination for glasses, and if the detection is unsuccessful, it is determined to be a calibration failure.

Figure 21:
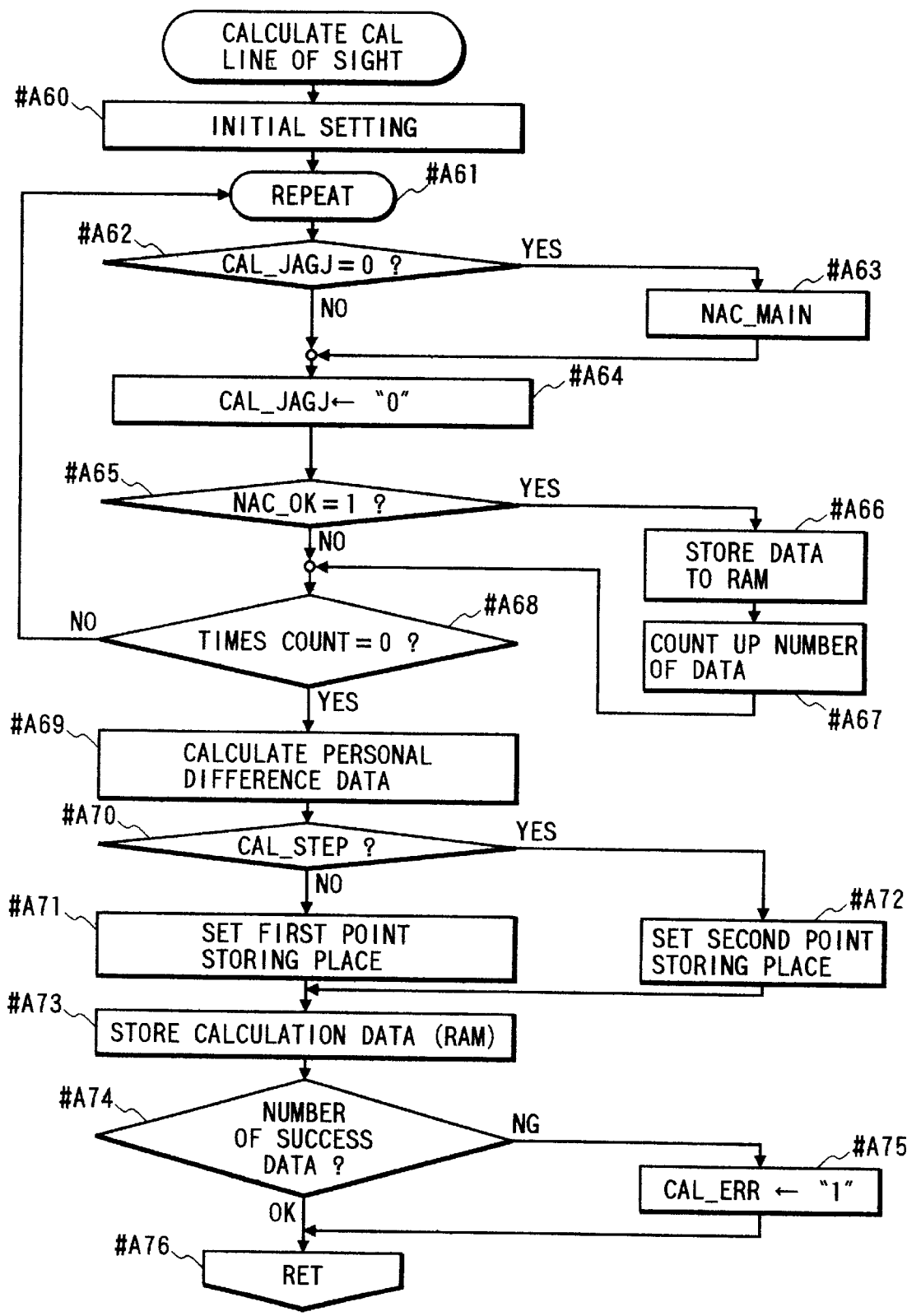
FIG. 21 is a flowchart of an operation at a calibration line of sight operation of the camera in FIG. 15.
Figure 4B:
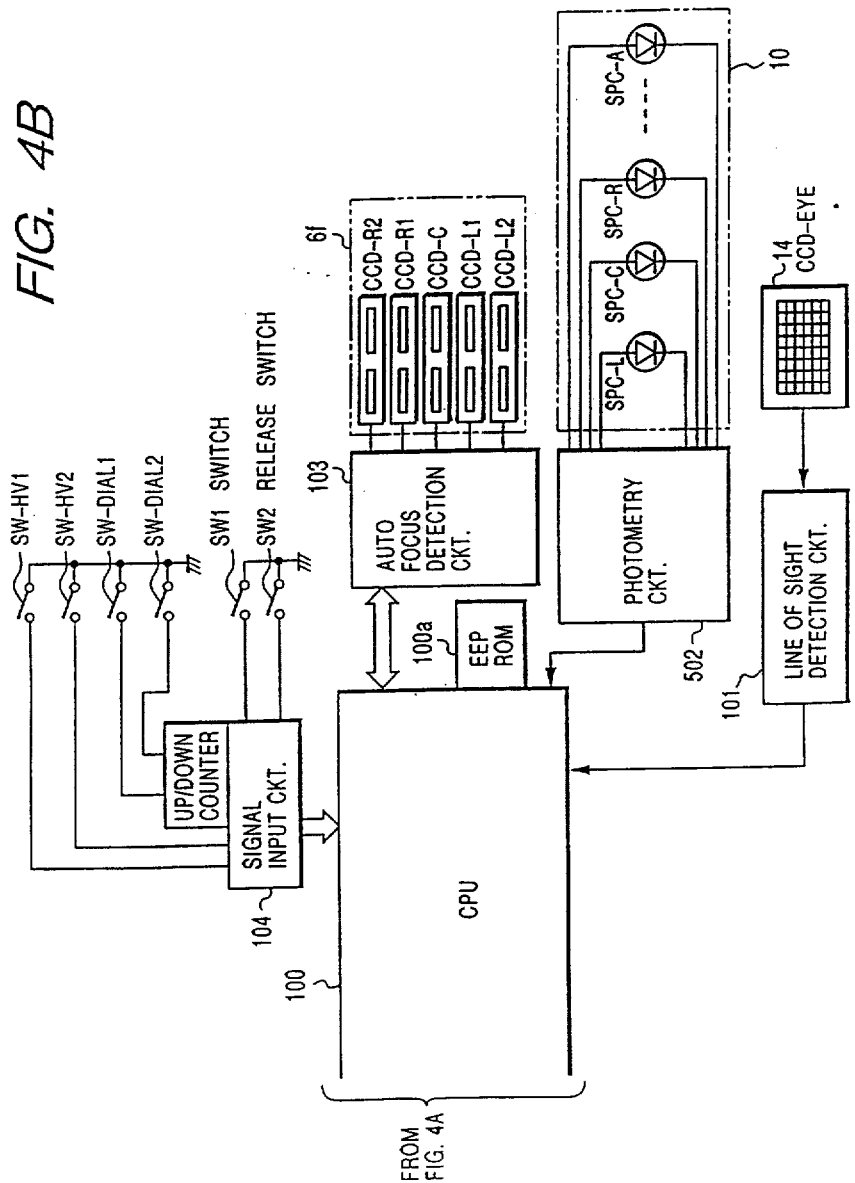
Figure 10:
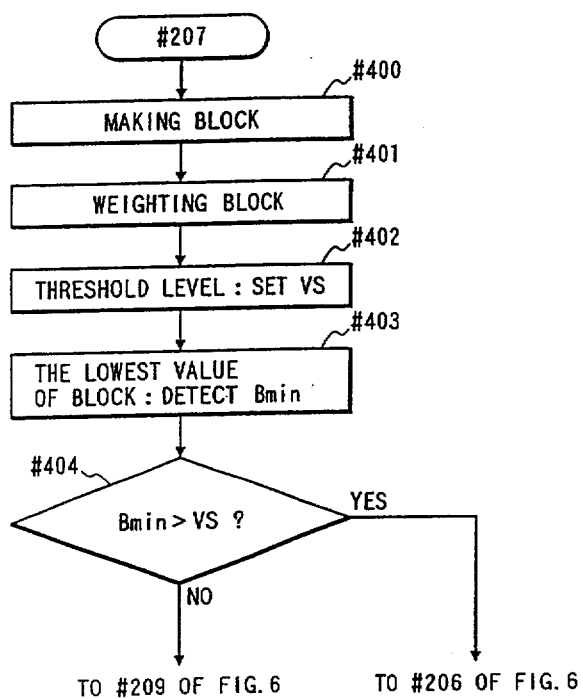
Figure 15:
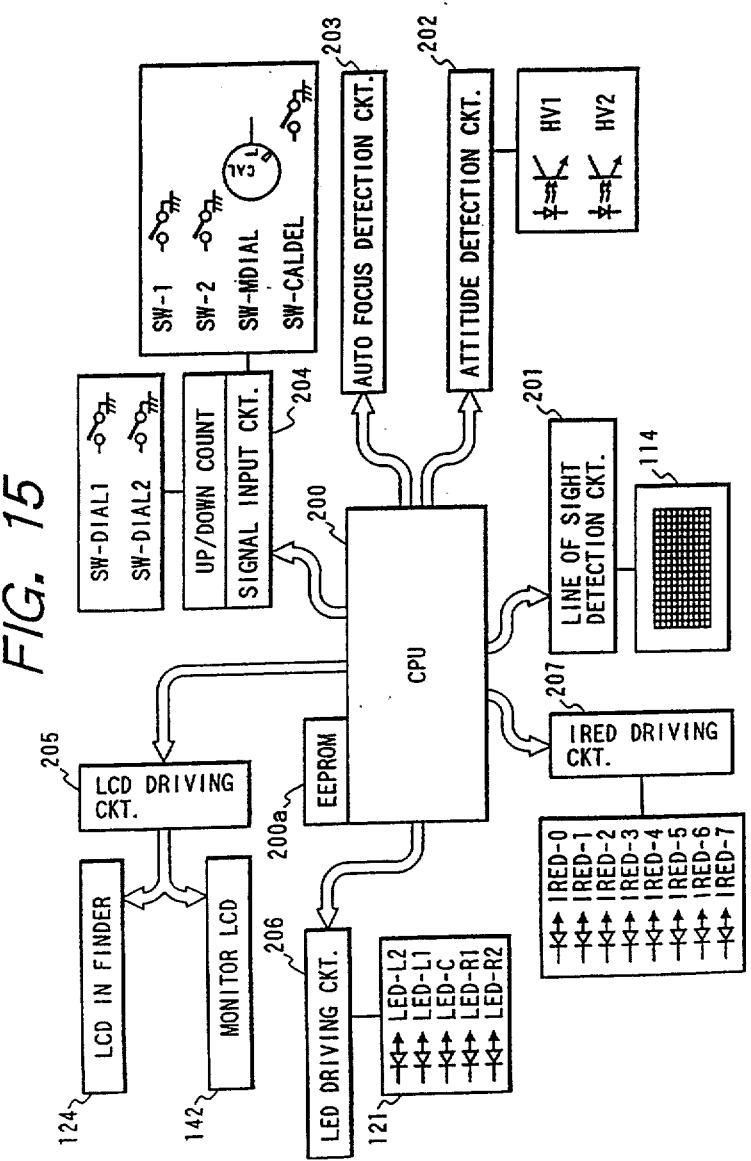

Next, the details of the "CAL line of sight calculation" subroutine in the steps #A13.5 and #A23 in FIGS. 17A and 17B are described by using a flowchart in FIG. 21.

Figures 18, 18A:
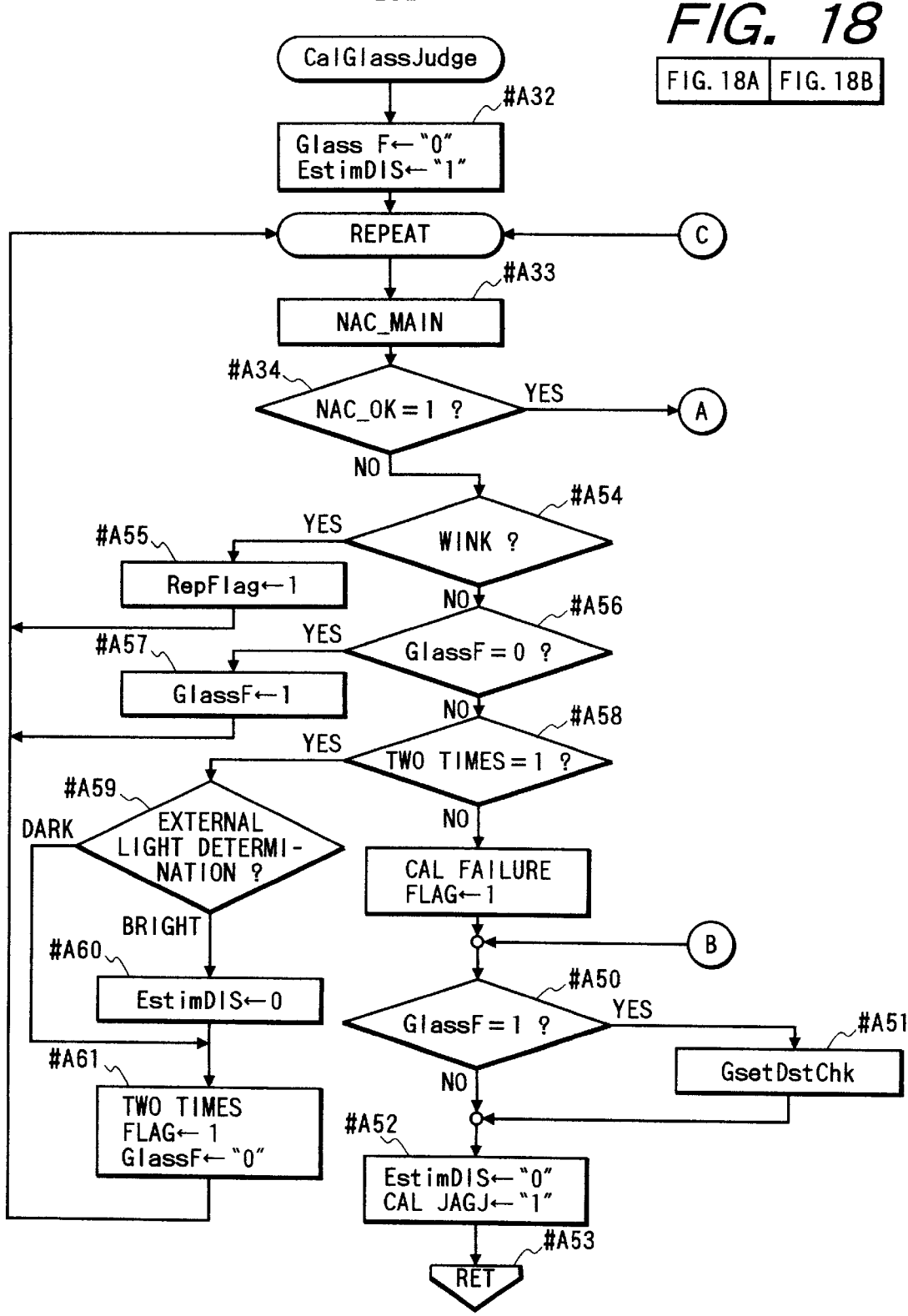
FIG. 18 is comprised of FIGS. 18A and 18B showing flowcharts of an operation in step #A13 in FIG. 17A.
Figure 18B:
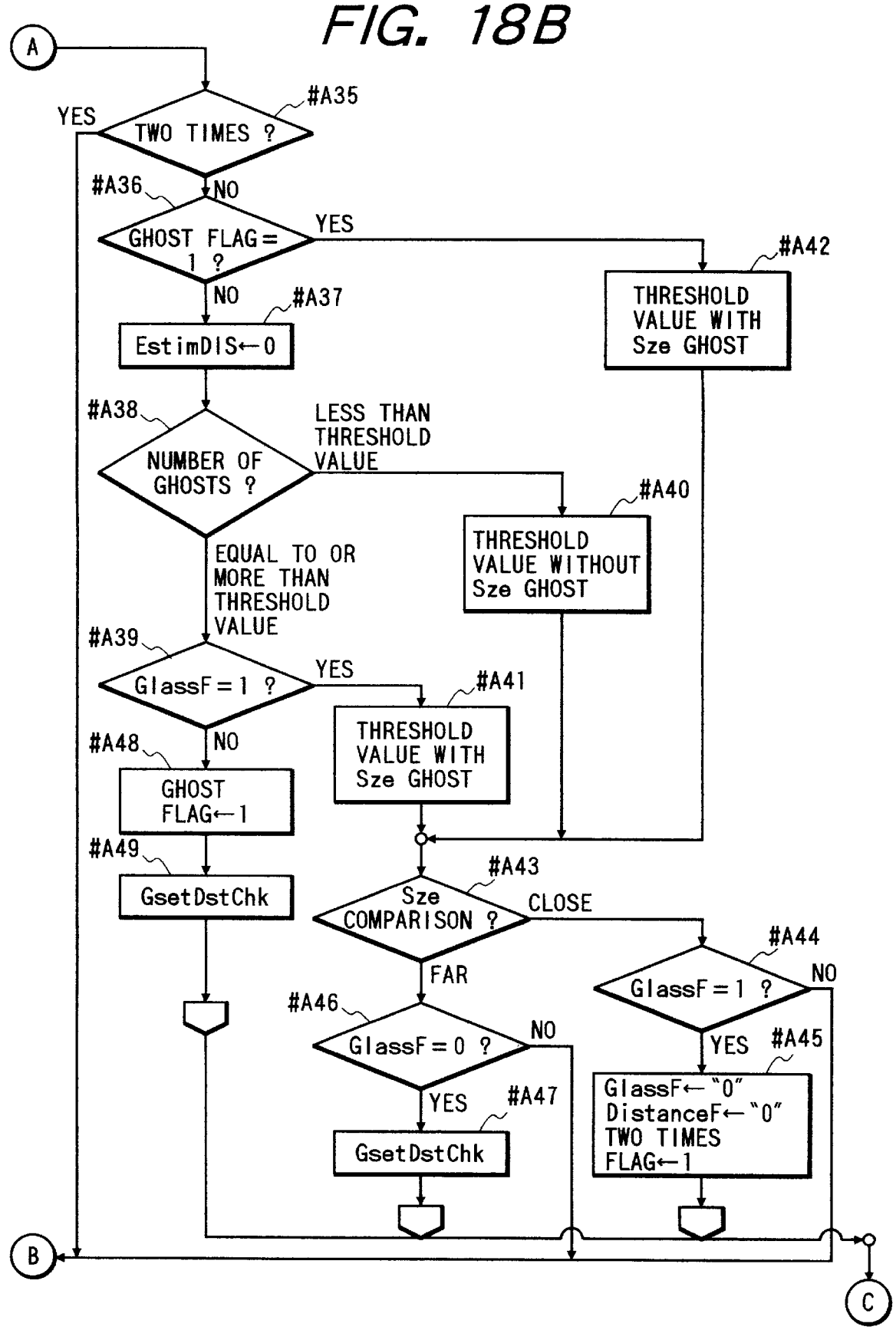

A "glasses determination" subroutine is executed (step #A13 in FIG. 17A) before the "CAL line of sight calculation" subroutine is called in the step #A13.5 in FIG. 17A, and the "CAL_JAGJ" flag is set to 1 in the last step, that is, in step #A52 in FIG. 18A. In this state, the program control shifts to step #A60 in FIG. 21.

First, before performing a CAL line of sight calculation, initialization is executed (#A60). After setting the number of times a line of sight detection is attempted in calibration and an address at which obtained data is stored, a counter for counting the number of successful detections and the CAL_ERR flag are cleared. Next, it is determined whether or not the CAL_JAGJ flag is set to 0 in step #A62. If it is set to 0, the "line of sight detection" (NAC_MAIN) (#A63) is called. If the control stays immediately after performing a glasses determination, the CAL_JAGJ flag is set to 1, and therefore, processing proceeds to step #A64 without calling the "line of sight detection" (NAC_MAIN).

By this operation, a result of the line of sight detection in the glasses determination can be used without being discarded.

Next, the CAL_JAGJ flag is cleared to 0 so as not to use duplicated data (#A64). Then, the result of the line of sight detection is determined (#A65). If the line of sight detection is successful, the NAC_OK flag is set to 1. Therefore, it is used for the determination. If the detection is successful, the currently detected line of sight data is stored at a predetermined address in step #A66 and the number of pieces of data of successful detections is counted in the next step #A67. Then, a count on a counter which down counts the number of attempts is subtracted (#A68), and if the value is not zero, processing in steps #A61 to #A68 is repeated a predetermined number of times. After the repetition by the predetermined number of times, the control passes through the loop and personal difference data is calculated (#A69). At this point, data for one index can be calculated.

Next, it is determined which index is observed by using the CAL_STEP2 flag. If it is a first point, the control branches to step #A71, and if it is a second point, the control branches to step #A72. Then, after setting an address at which the calculation data is stored, the calculation data is stored (#A73). Subsequently, it is determined whether or not the number of pieces of data of successful detections (counted in the step #A67) is greater than a predetermined number (#A74). If it is smaller than the predetermined number, the CAL_ERR flag is set to 1 (#A75). Finally, the subroutine is returned (#A76).

By this operation, it becomes possible to utilize effectively the "glasses determination" subroutine, that is, a calculation result of a line of sight detection which has been executed to determine the illumination or sensor control to obtain personal difference correction data without wasting data. In other words, a calibration operation is completed more quickly by a time for once line of sight detection.

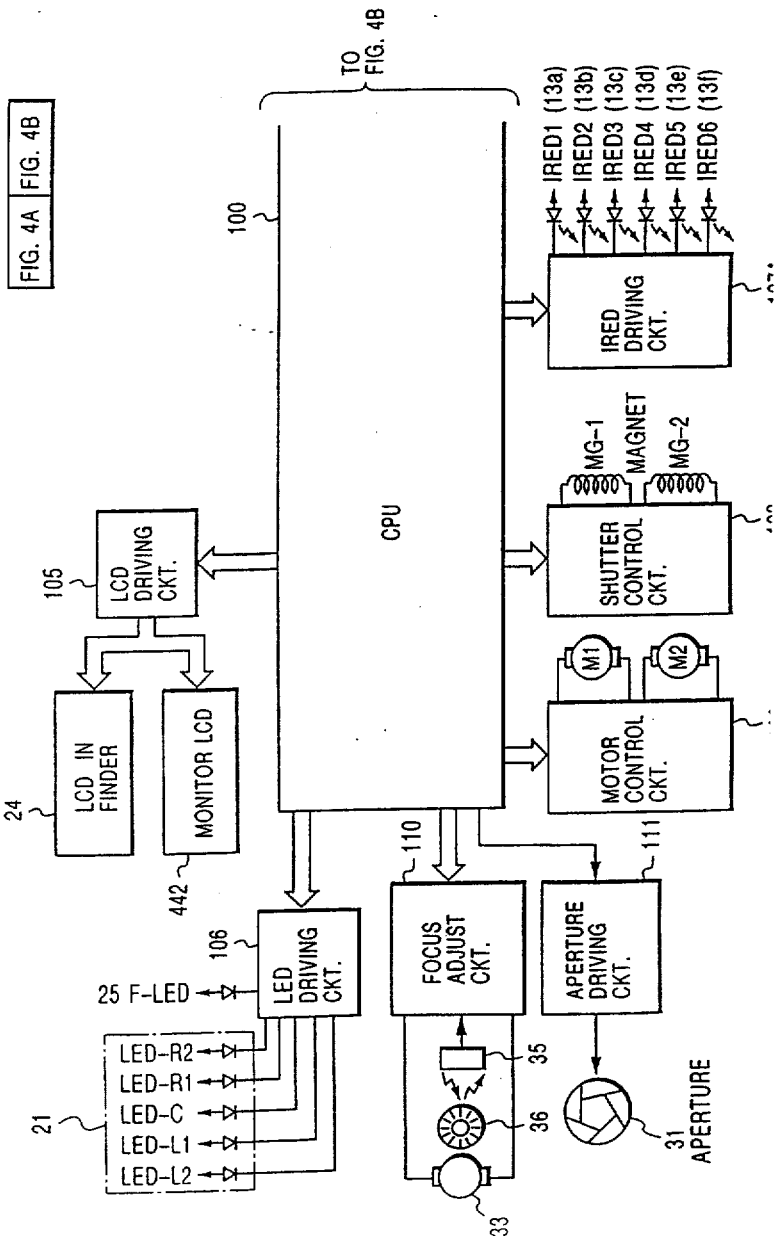

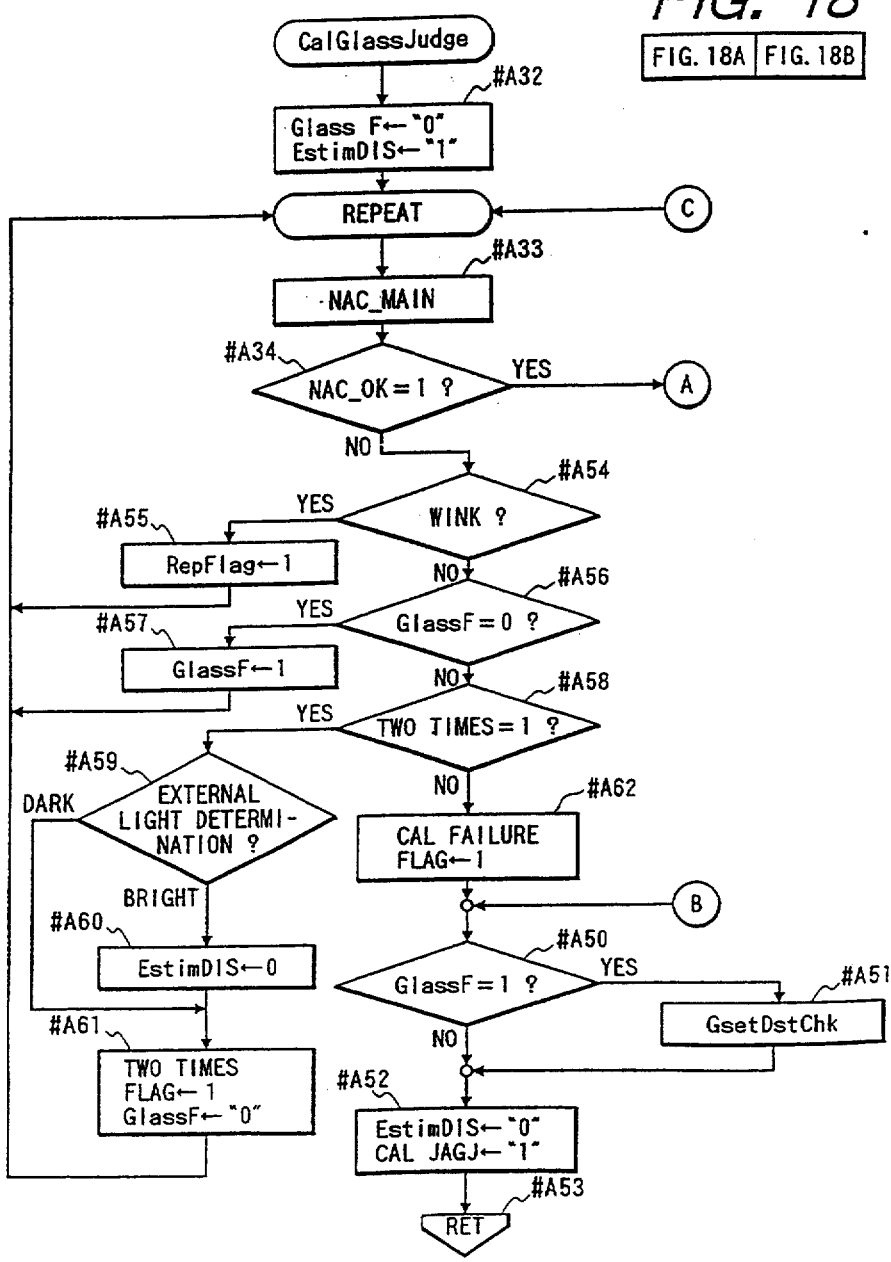

What is claimed is:

1. A line of sight detection device comprising:
   illuminating means for illuminating an eyeball of a user;
   light receiving means for receiving light from the eyeball of said user;
   wink detection means for detecting a wink of said user;
   line of sight detection means for detecting a line of sight of said user based on a light receiving state of said light receiving means; and
   control means for changing at least one of an illuminating condition of said illuminating means and a light receiving condition of said light receiving means and for repeating a line of sight detecting operation based on the light receiving state of said light receiving means during the line of sight detecting operation,
   wherein said control means repeats a line of sight detecting operation without changing the illuminating condition of said illuminating means and the light receiving condition of said light receiving means when said wink detection means detects a wink of said user during a line of sight detecting operation.

2. A line of sight detection device according to claim 1, wherein said light receiving means is an imaging sensor in which a gain can be adjusted and said control means changes the light receiving condition of said light receiving means by adjusting said gain.

3. A line of sight detection device according to claim 1, wherein said light receiving means is an accumulation-type imaging sensor and said control means changes the light receiving condition of said light receiving means by changing an accumulation time of said accumulation-type imaging sensor.

4. A line of sight detection device according to claim 1, wherein said control means changes the illuminating condition of said illuminating means by adjusting a luminance of said illuminating means.

5. A line of sight detection device according to claim 1, wherein said illuminating means has a plurality of illuminating elements and said control means changes the illuminating condition of said illuminating means by selecting which one of said plurality of illuminating elements is turned on.

6. A line of sight detection device according to claim 5, wherein said control means changes the illuminating condition of said illuminating means by adjusting a value of current flowing to said selected one of said plurality of illuminating elements.

7. A line of sight detection device according to claim 1, wherein said wink detection means detects a wink of said user based on the light receiving state of said light receiving means.

8. A line of sight detection device according to claim 7, wherein said wink detection means detects a wink of said user by comparing an output of said light receiving means with a predetermined value.

9. A line of sight detection device according to claim 8, wherein said light receiving means includes an area sensor having a plurality of blocks each comprising a plurality of picture elements, and said wink detection means detects a wink of said user by comparing an average output of the plurality of picture elements included in an identical block with a predetermined value.

10. A line of sight detection device according to claim 9, wherein said wink detection means detects a wink of said user by selecting a block from which a minimum value is output from among said plurality of blocks and comparing an output of said block with a predetermined value.

11. A line of sight detection device according to claim 8, wherein said light receiving means includes an area sensor having a plurality of blocks each comprising a plurality of picture elements, and said wink detection means detects a wink of said user by weighting values output from said plurality of blocks according to respective positions of the plurality of blocks, selecting a block whose output value after weighting is minimum, and comparing the output value after weighting of the block with a predetermined value.

12. A line of sight detection device according to claim 1, wherein said wink detection means does not perform wink detection when said control means repeats a line of sight detecting operation without changing the illuminating condition of said illuminating means and the light receiving condition of said light receiving means and said wink detection means.

13. A line of sight detection device comprising:
   illuminating means for illuminating an eyeball of a user;
   light receiving means for receiving light from the eyeball of said user;
   line of sight detection means for detecting a line of sight of said user based on a light receiving state of said light receiving means;
   determining means for determining whether a line of sight detection by said line of sight detection means is successful;
   estimation means for estimating whether a failure to detect a line of sight is caused due to a wink of said user based on a light receiving state of said light receiving means; and
   control means for repeating a line of sight detection operation when said estimation means estimates that a failure to detect a line of sight corresponds to a wink of the user, and for changing at least one of an illuminating condition of said illuminating means and a light receiving condition of said light receiving means when said estimation means estimates that a failure to detect a line of sight corresponds to a wink of the user, based on the light receiving state of said light receiving means during a line of sight detecting operation, and for repeating the line of sight detecting operation.

14. A line of sight detection device according to claim 13, wherein said light receiving means is an imaging sensor in which a gain can be adjusted and said control means changes the light receiving condition of said light receiving means by adjusting said gain.

15. A line of sight detection device according to claim 13, wherein said light receiving means is an accumulation-type imaging sensor and said control means changes the light receiving condition of said light receiving means by changing an accumulation time of said accumulation-type imaging sensor.

16. A line of sight detection device according to claim 13, wherein said control means changes the illuminating condition of said illuminating means by adjusting a luminance of said illuminating means.

17. A line of sight detection device according to claim 13, wherein said illuminating means includes a plurality of illuminating elements and said control means changes the illuminating condition of said illuminating means by selecting which one of said plurality of illuminating elements is turned on.

18. A line of sight detection device according to claim 17, wherein said control means changes the illuminating condition of said illuminating means by adjusting a value of current flowing to said selected one of said plurality of illuminating elements.

19. A line of sight detection device according to claim 13, wherein said wink detection means detects a wink of said user by comparing an output of said light receiving means with a predetermined value.

20. A line of sight detection device according to claim 19, wherein said light receiving means includes an area sensor having a plurality of blocks each comprising a plurality of picture elements, and said wink detection means detects a wink of said user by comparing an average output of the plurality of picture elements included in an identical block with a predetermined value.

21. A line of sight detection device according to claim 20, wherein said wink detection means detects a wink of said user by selecting a block from which a minimum value is output from among said plurality blocks and comparing an output of said block with a predetermined value.

22. A line of sight detection device according to claim 19, wherein said light receiving means includes an area sensor having a plurality of blocks each comprising a plurality of picture elements, and said wink detection means detects a wink of said user by weighting values output from said plurality of blocks according to respective positions of the plurality of blocks, selecting a block whose output value after weighting is minimum, and comparing the output value after weighting of the block with a predetermined value.

23. A line of sight detection device according to claim 13, further comprising:
    a counter for counting the number of times that said determination means has determined that a line of sight detection is unsuccessful,
    wherein said control means stops a line of sight detection operation if the number of times of unsuccessful line of sight detection exceeds a predetermined count.

24. An apparatus having a line of sight detection device, the apparatus comprising:
    illuminating means for illuminating an eyeball of a user;
    light receiving means for receiving light from the eyeball of said user;
    wink detection means for detecting a wink of said user;
    line of sight detection means for detecting a line of sight of said user based on a light receiving state of said light receiving means; and
    control means for changing at least one of an illuminating condition of said illuminating means and a light receiving condition of said light receiving means and for repeating a line of sight detecting operation based on the light receiving state of said light receiving means during a line of sight detecting operation,
    wherein said control means repeats a line of sight detecting operation without changing the illuminating condition of said illuminating means and the light receiving condition of said light receiving means when said wink detection means detects a wink of said user during the line of sight detecting operation.

25. An apparatus having a line of sight detection device according to claim 24, wherein said light receiving means is an imaging sensor in which a gain can be adjusted and said control means changes the light receiving condition of said light receiving means by adjusting said gain.

26. An apparatus having a line of sight detection device according to claim 24, wherein said light receiving means is an accumulation-type imaging sensor and said control means changes the light receiving condition of said light receiving means by changing an accumulation time of said accumulation-type imaging sensor.

27. An apparatus having a line of sight detection device according to claim 24, wherein said control means changes the illuminating condition of said illuminating means by adjusting a luminance of said illuminating means.

28. An apparatus having a line of sight detection device according to claim 24, wherein said illuminating means includes a plurality of illuminating elements and said control means changes the illuminating condition of said illuminating means by selecting which one of said plurality of illuminating elements is turned on.

29. An apparatus having a line of sight detection device according to claim 28, wherein said control means changes the illuminating condition of said illuminating means by adjusting a value of current flowing to said selected one of said plurality of illuminating elements.

30. An apparatus having a line of sight detection device according to claim 24, wherein said wink detection means detects a wink of said user based on the light receiving state of said light receiving means.

31. An apparatus having a line of sight detection device according to claim 30, wherein said wink detection means detects a wink of said user by comparing an output of said light receiving means with a predetermined value.

32. An apparatus having a line of sight detection device according to claim 31, wherein said light receiving means includes an area sensor having a plurality of blocks each comprising a plurality of picture elements, and said wink detection means detects a wink of said user by comparing an average output of the plurality of the picture elements included in an identical block with a predetermined value.

33. An apparatus having a line of sight detection device according to claim 32, wherein said wink detection means detects a wink of said user by selecting a block from which a minimum value is output from among of said plurality of blocks and comparing an output of said selected block with a predetermined value.

34. An apparatus having a line of sight detection device according to claim 31, wherein said light receiving means includes an area sensor having a plurality of blocks each comprising a plurality of picture elements, and said wink detection means detects a wink of said user by weighting values output from said plurality of blocks according to respective positions of the plurality of blocks, selecting a block whose output value after weighting is minimum, and comparing the output value after weighting of the block with a predetermined value.

35. An apparatus having a line of sight detection device according to claim 23, wherein said wink detection means does not perform wink detection when said control means repeats a line of sight detecting operation without changing the illuminating condition for said illuminating means and the light receiving condition of said light receiving means and said wink detection means.

36. An apparatus having a line of sight detection device, the apparatus comprising:
  illuminating means for illuminating an eyeball of a user;
  light receiving means for receiving light from the eyeball of said user;
  line of sight detection means for detecting a line of sight of said user based on a light receiving state of said light receiving means;
  determination means for determining whether a line of sight detection by said line of sight detection means is successful;
  estimation means for estimating whether a failure to detect a line of sight is caused due to a wink of said user based on a light receiving state of said light receiving means; and
  control means for repeating a line of sight determination operation when said estimation means estimates that a failure to detect a line of sight corresponds to a wink of the user, and for changing at least one of an illuminating condition of said illuminating means and a light receiving condition of said light receiving means when said estimation means estimates that a failure to detect a line of sight corresponds to a wink of the user, based on the light receiving state of said light receiving means during a line of sight detecting operation, and for repeating the line of sight detecting operation.

37. An apparatus having a line of sight detection device according to claim 36, wherein said light receiving means is an imaging sensor in which a gain can be adjusted and said control means changes the light receiving condition of said light receiving means by adjusting said gain.

38. An apparatus having a line of sight detection device according to claim 36, wherein said light receiving means is an accumulation-type imaging sensor and said control means changes the light receiving condition of said light receiving means by changing an accumulation time of said accumulation-type imaging sensor.

39. An apparatus having a line of sight detection device according to claim 36, wherein said control means changes the illuminating condition of said illuminating means by adjusting a luminance of said illuminating means.

40. An apparatus having a line of sight detection device according to claim 36, wherein said illuminating means includes a plurality of illuminating elements and said control means changes the illuminating condition of said illuminating means by selecting which one of said plurality of illuminating elements is turned on.

41. An apparatus having a line of sight detection device according to claim 40, wherein said control means changes the illuminating condition of said illuminating means by adjusting a value of current flowing to said selected one of said plurality of illuminating elements.

42. An apparatus having a line of sight detection device according to claim 36, wherein said wink detection means detects a wink of said user by comparing an output of said light receiving means with a predetermined value.

43. An apparatus having a line of sight detection device according to claim 42, wherein said light receiving means includes an area sensor having a plurality of blocks each comprising a plurality of picture elements, and said wink detection means detects a wink of said user by comparing an average output of the plurality of the picture elements included in an identical block with a predetermined value.

44. An apparatus having a line of sight detection device according to claim 43, wherein said wink detection means detects a wink of said user by selecting a block from which a minimum value is output from among said plurality of blocks and comparing an output of said block with a predetermined value.

45. An apparatus having a line of sight detection device according to claim 42, wherein said light receiving means includes an area sensor having a plurality of blocks each comprising a plurality of picture elements, and said wink detection means detects a wink of said user by weighting values output from said plurality of blocks according to respective positions of the plurality of blocks, selecting a block whose output value after weighting is minimum, and comparing the output value after weighting of the block with a predetermined value.

46. An apparatus having a line of sight detection device according to claim 36, further comprising:
  a counter for counting the number of times that said determination means has determined that a line of sight detection is unsuccessful,
  wherein said control means stops a line of sight detection operation if the number of times of unsuccessful line of sight detection exceeds a predetermined count.

47. A line of sight detection device comprising:
  line of sight detection means for detecting a line of sight of a user with a predetermined condition for line of sight;
  wink detection means for detecting a wink of the user during a line of sight detection operation; and
  control means for repeating a line of sight detection operation with the predetermined condition for line of sight when said wink detection means detects a wink of the user during the line of sight detection operation.

48. A line of sight detection device according to claim 47, wherein said line of sight detection means includes illuminating means for illuminating an eyeball of said user and light receiving means for receiving light from the eyeball of said user, and said wink detection means detects a wink of said user based on the light receiving state of said light receiving means.

49. A line of sight detection device according to claim 48, wherein said wink detection means detects a wink of said user by comparing an output of said light receiving means with a predetermined value.

50. A line of sight detection device according to claim 49, wherein said light receiving means includes an area sensor having a plurality of blocks each comprising a plurality of picture elements, and said wink detection means detects a wink of said user by comparing an average output of the plurality of picture elements included in an identical block with a predetermined value.

51. A line of sight detection device according to claim 50, wherein said wink detection means detects a wink of said user by selecting a block from which a minimum value is output from among said plurality blocks and comparing an output of said block with a predetermined value.

52. A line of sight detection device according to claim 49, wherein said light receiving means includes an area sensor having a plurality of blocks each comprising a plurality of picture elements, and said wink detection means detects a wink of said user by weighting values output from said plurality of blocks according to respective positions of the plurality of blocks, selecting a block whose output value after weighting is minimum, and comparing the output value after weighting of the block with a predetermined value.

53. A line of sight detection device according to claim 47, wherein said wink detection means does not perform wink detection when said control means repeats a line of sight detecting operation without changing said predetermined line of sight detection condition.

54. A line of sight detection device comprising:
   line of sight detection means for detecting a line of sight of a user under a predetermined condition for line of sight detection;
   determination means for determining whether a line of sight detection by said line of sight detection means is successful;
   estimation means for estimating whether a failure to detect a line of sight is caused due to a wink of said user, based on a light receiving state of said light receiving means; and
   control means for repeating a line of sight determination operation with the predetermined condition for line of sight when said estimation means estimates that a failure to detect a line of sight corresponds to a wink of said user, and for changing the predetermined condition for line of sight when said estimation means estimates that a failure to detect a line of sight corresponds to a wink of said user, and for repeating the line of sight detecting operation.

55. A line of sight detection device according to claim 54, wherein said line of sight detection means includes illuminating means for illuminating the eyeball of said user and light receiving means for receiving light from the eyeball of said user and said wink detection means detects a wink of said user based on the light receiving state of said light receiving means.

56. A line of sight detection device according to claim 55, wherein said wink detection means detects a wink of said user by comparing an output of said light receiving means with a predetermined value.

57. A line of sight detection device according to claim 56, wherein said light receiving means includes an area sensor having a plurality of blocks each comprising a plurality of picture elements, and said wink detection means detects a wink of said user by comparing an average output of the plurality of picture elements included in an identical block with a predetermined value.

58. A line of sight detection device according to claim 57, wherein said wink detection means detects a wink of said user by selecting a block from which a minimum value is output from among of said plurality of blocks and comparing an output of said block with a predetermined value.

59. A line of sight detection device according to claim 56, wherein said light receiving means includes an area sensor having a plurality of blocks each comprising a plurality of picture elements, and said wink detection means detects a wink of said user by weighting values output from said plurality of blocks according to respective positions of the plurality of blocks, selecting a block whose output value after weighting is minimum, and comparing the output value after weighting of the block with a predetermined value.

60. A line of sight detection device according to claim 54, wherein said wink detection means does not perform wink detection when said control means repeats a line of sight detecting operation without changing said predetermined line of sight detection condition.

61. A line of sight detection apparatus, comprising:
   illumination means for illuminating an eyeball of a user;
   light receiving means for receiving a light beam reflected by the eyeball of the user;
   line of sight detection means for detecting the line of sight of the eyeball of the user based on an output of said light receiving means;
   judging means for judging if the output of said light receiving means is within a predetermined range capable of detecting the line of sight during a line of sight detection operation of said line of sight detection means; and
   control means for repeatedly performing a line of sight detection operation and altering at least one of an illumination condition of said illumination means and a light receiving condition of said light receiving means for successive line of sight detection operations, based on a light receiving state of said light receiving means during a time in which a line of sight detection operation is being performed, wherein said control means repeats the line of sight detection operation without altering the illumination condition of said illumination means and the light receiving condition of said light receiving means when the output of said light receiving means is not within the predetermined range.

62. A line of sight detection apparatus according to claim 61, wherein said light receiving means is an image pick-up sensor, a gain of which is adjustable, and said control means alters the light receiving condition of said light receiving means by adjusting the gain of said image pick-up sensor.

63. A line of sight detection apparatus according to claim 61, wherein said light receiving means is an accumulation type image pick-up sensor, and said control means changes the light receiving condition of said light receiving means by altering a time of accumulation of said accumulation type image pick-up sensor.

64. A line of sight detection apparatus according to claim 61, wherein said control means alters the illumination condition of said illumination means by adjusting a luminance of said illumination means.

65. A line of sight detection apparatus according to claim 61, wherein said illumination means comprises a plurality of illumination elements, and said control means alters the illumination condition of said illumination means by selectively lighting said plurality of illumination elements.

66. A line of sight detection apparatus according to claim 65, wherein said control means alters the illumination condition of said illumination means by adjusting a current amount to be fed to selected illumination elements.

67. A line of sight detection apparatus, comprising:

line of sight detection means for detecting a line of sight of a user under a predetermined condition;

judging means having a light receiving element for receiving a light beam reflected by the eyeball of the user and for judging if an output of said light receiving element is within a predetermined range capable of detecting a line of sight during a line of sight detection operation; and control means for repeatedly performing a line of sight detection operation while maintaining a predetermined line of sight detection condition when said judging means judges that the output of said light receiving element is not within the predetermined range.

68. A line of sight detection apparatus according to claim 67, wherein said light receiving element includes a plurality of blocks each of which has a plurality of picture elements, and said judging means judges if an average of outputs from said plurality of picture elements in a same block is within the predetermined range.

69. A line of sight detection apparatus according to claim 68, wherein said judging means selects a block from among said plurality of blocks which produces a minimum value, and judges if the output of the selected chosen block is within the predetermined range.

70. A line of sight detection apparatus according to claim 67, wherein said light receiving element is an area sensor comprising a plurality of blocks each of which includes a plurality of picture elements, and said judging means weights outputs of each of said plurality of blocks in accordance with a location of respective blocks and, among the weighted outputs, chooses a block whose output is minimum and judges if the output is in the predetermined range.

* * * * *

UNITED STATES PATENT AND TRADEMARK OFFICE
CERTIFICATE OF CORRECTION

PATENT NO. : 5,926,655
DATED : July 20, 1999
INVENTOR(S) : YOSHIAKI IRIE, ET AL.

It is certified that error appears in the above-identified patent and that said Letters Patent is hereby corrected as shown below:

Column 6

Line 1, " ""on" should read --to "on"--.
    Line 4, " "on"" should read --to "on"--.
    Line 8, "line" should read --lines--.

Column 12

Line 2, "is step #309, is" should read --step #309,--.

Column 13

Line 8, "be" should read --be for--.

Column 16

Line 21, "with a" should read --by--
    Line 32, "set" should read --set to--.
    Line 35, "set" should read --set to--.

UNITED STATES PATENT AND TRADEMARK OFFICE
CERTIFICATE OF CORRECTION

PATENT NO. : 5,926,655
DATED : July 20, 1999
INVENTOR(S) : YOSHIAKI IRIE, ET AL.

It is certified that error appears in the above-identified patent and that said Letters Patent is hereby corrected as shown below:

Column 18

Line 5, "set" should read --set to--.
Line 23, "set" should read --set to--.
Line 24, "set" should read --set to--.
Line 35, "set" should read --set to--.
Line 36, "set" should read --set to--.
Line 49, "set" (first and second occurrences) should read --set to--;
Line 58, ""set" should read --set to-- (first and second occurrences).
Line 66, ""on"" should read --to "on"--.

Column 19

Line 2, ""on"," should read --to "on,"--.

Column 20

Line 14, "round,detection" should read --round detection,--.
Line 15, "the" should read --then--.

UNITED STATES PATENT AND TRADEMARK OFFICE
CERTIFICATE OF CORRECTION

PATENT NO. : 5,926,655  
DATED : July 20, 1999  
INVENTOR(S) : YOSHIAKI IRIE, ET AL.

It is certified that error appears in the above-identified patent and that said Letters Patent is hereby corrected as shown below:

Column 21

Line 65, "round,detection" should read --round detection,--.

Column 23

Line 24, "is" (2nd occur.) should read --is,--;  
    Line 45, "round, detection" should read --round detection,--

Column 24

Line 12, "at the next time" should read --in the next round-;  
    Line 15, "of the" should read --of--.

Column 25

Line 67, "a" should be deleted.

UNITED STATES PATENT AND TRADEMARK OFFICE
CERTIFICATE OF CORRECTION

PATENT NO. : 5,926,655
DATED : July 20, 1999
INVENTOR(S) : YOSHIAKI IRIE, ET AL.

It is certified that error appears in the above-identified patent and that said Letters Patent is hereby corrected as shown below:

<u>Column 27</u>

Line 41, "plurality" should read --plurality of--.

<u>Column 31</u>

Line 9, "plurality" should read --plurality of--.

<u>In the Figures</u>

Replace FIG. 4A with attached amended FIG 4A.
Replace FIG. 4B with attached amended FIG 4B.
Replace FIG. 10 with attached amended FIG 10.
Replace FIG. 15 with attached amended FIG. 15.
Replace FIG. 18A with attached amended FIG 18A.

Signed and Sealed this

Second Day of May, 2000

Attest:

Q. TODD DICKINSON

*Attesting Officer*   *Director of Patents and Trademarks*